United States Patent
Takashima et al.

(10) Patent No.: US 9,519,382 B2
(45) Date of Patent: Dec. 13, 2016

(54) TOUCH PANEL DEVICE AND PORTABLE INFORMATION TERMINAL INCLUDING TOUCH PANEL DEVICE

(75) Inventors: Kouichiro Takashima, Tokyo (JP); Mitsuhiro Tanihata, Tokyo (JP); Fumiyuki Ito, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 19 days.

(21) Appl. No.: 13/550,916

(22) Filed: Jul. 17, 2012

(65) Prior Publication Data

US 2013/0181938 A1   Jul. 18, 2013

Related U.S. Application Data

(60) Provisional application No. 61/530,439, filed on Sep. 2, 2011.

(51) Int. Cl.
*G06F 3/00* (2006.01)
*G06F 3/044* (2006.01)

(52) U.S. Cl.
CPC .................................. *G06F 3/044* (2013.01)

(58) Field of Classification Search
CPC ...... G06F 3/041; G06F 3/044; G06F 3/04886; G06F 2203/0339; G06F 2203/04107; G09G 5/00
USPC .......................... 345/173, 174, 178; 361/679
See application file for complete search history.

(56) References Cited

U.S. PATENT DOCUMENTS

| | | | | |
|---|---|---|---|---|
| 7,158,124 | B2* | 1/2007 | Nakajima | 345/173 |
| 7,439,962 | B2* | 10/2008 | Reynolds et al. | 345/173 |
| 7,466,307 | B2* | 12/2008 | Trent et al. | 345/173 |
| 7,800,592 | B2* | 9/2010 | Kerr et al. | 345/173 |
| 2005/0012723 | A1* | 1/2005 | Pallakoff | G06F 1/1616 345/173 |
| 2005/0179668 | A1* | 8/2005 | Edwards | G06F 3/044 345/173 |
| 2006/0197750 | A1* | 9/2006 | Kerr | G06F 1/1626 345/173 |
| 2007/0273660 | A1* | 11/2007 | XiaoPing | G06F 3/0362 345/173 |
| 2008/0042976 | A1* | 2/2008 | Trent | G06F 3/03547 345/157 |
| 2008/0048992 | A1* | 2/2008 | Sato | 345/173 |

(Continued)

FOREIGN PATENT DOCUMENTS

JP   2011-086122   4/2011

*Primary Examiner* — Michael Faragalla
(74) *Attorney, Agent, or Firm* — Oblon, McClelland, Maier & Neustadt, L.L.P.

(57) ABSTRACT

A touch panel device including an electrostatic capacitance type touch sensor in which a plurality of transparent electrode units are arranged in X and Y directions; a conductive layer that is connected to predetermined transparent electrode units among the plurality of transparent electrode units forming the electrostatic capacitance type touch sensor unit and that extends outward from an arrangement area of the plurality of transparent electrode units; a position detection unit that detects a position at which an external object contacts a surface near the electronic capacitance type touch sensor or the conductive layer; and a processor that executes a predetermined application program based on the position detected by the IC unit.

15 Claims, 21 Drawing Sheets

(56) References Cited

U.S. PATENT DOCUMENTS

| | | | |
|---|---|---|---|
| 2008/0142352 A1* | 6/2008 | Wright | G06F 3/044 200/600 |
| 2009/0295753 A1* | 12/2009 | King et al. | 345/174 |
| 2010/0053861 A1* | 3/2010 | Kim et al. | 361/679.01 |
| 2010/0123675 A1* | 5/2010 | Ippel | G06F 3/044 345/173 |

* cited by examiner

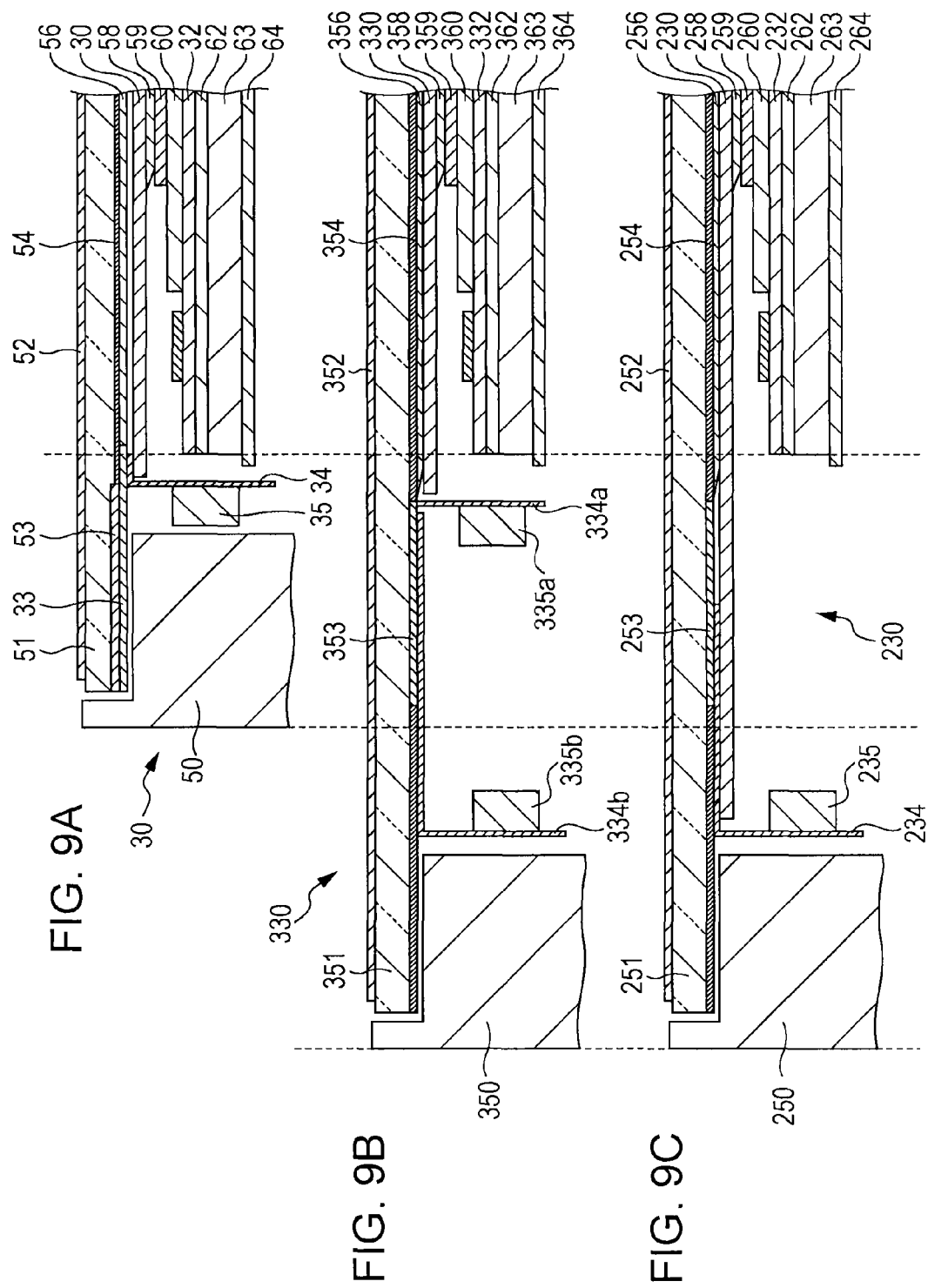

| ON DETERMINATION | EXTENDED DETECTION AREA | TOUCH PANEL DETECTION AREA |
|---|---|---|
| DA | V | |
| DB | | V |
| DA → DB | | V |
| DB → DA | V | |

FIG. 22

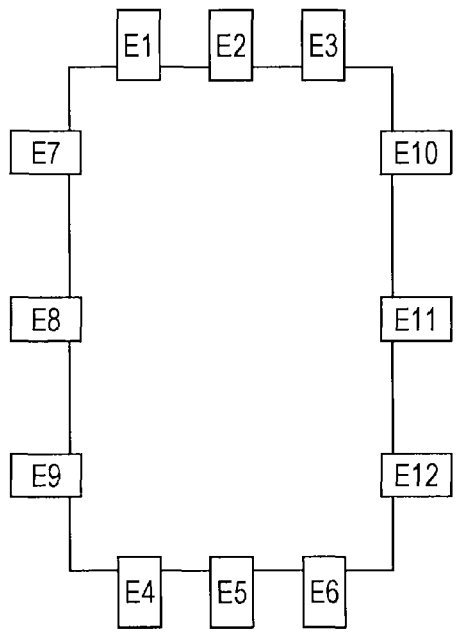

FIG. 23

| VERTICAL/ HORIZONTAL | APPLICATION | EXTENDED DETECTION AREA | FUNCTIONS OF FUNCTION BUTTONS |
|---|---|---|---|
| HORIZONTAL | CAMERA (REPRODUCTION MODE) | E1, E2, AND E3<br>E4, E5, AND E6 | REPRODUCTION SWITCH<br>EXPANSION/REDUCTION ZOOM |
| HORIZONTAL | CAMERA (IMAGE-CAPTURING MODE) | E12<br>E4, E5, AND E6 | SHUTTER<br>IMAGE-CAPTURING ANGLE OF VIEW |
| HORIZONTAL | MOVING IMAGE | E7, E8, AND E9 | REPRODUCTION POSITION SLIDER |
| VERTICAL | MAIL | E7, E8, AND E9<br>/OR E10, E11, AND E12 | SCROLL |
| HORIZONTAL | CHARACTER INPUT | E1, E2, AND E3<br>/AND E4, E5, AND E6 | CHARACTER SPECIFICATION AND DECISION |

TOUCH PANEL DEVICE AND PORTABLE INFORMATION TERMINAL INCLUDING TOUCH PANEL DEVICE

CROSS REFERENCE TO RELATED APPLICATIONS

This application is related to and claims priority under 35 U.S.C. §119(e) to Provisional Application Ser. No. 61/530/439, filed Sep. 2, 2011, the contents of which are hereby incorporated herein by reference.

BACKGROUND

1. Field

The present specification relates to a touch panel device capable of detecting that a finger or the like of a user has touched or approached an external conductor by detecting, for example, a change in electrostatic capacitance, and relates to a portable information terminal including the touch panel device.

2. Description of the Related Art

As an example of a touch panel capable of detecting a change in electrostatic capacitance as a result of a finger or the like of a user having touched or approached (hereinafter these actions will be referred to as a touch) an external conductor, an electrostatic capacitance type touch panel sensor disclosed in unexamined patent publication (PTL 1) of Japanese Unexamined Patent Application Publication No. 2011-86122 is known.

The electrostatic capacitance type touch panel sensor disclosed in this patent document includes a transparent base, many transparent electrode units made up of x-direction transparent electrode units that are connected through an x-direction connection unit in an x direction and y-direction transparent electrode units that are positioned between x-direction transparent electrode units, which are arranged in such a manner as to be adjacent to one another in the x and y directions on the upper side surface of the transparent base, and outer periphery wiring that is connected to the x-direction transparent electrode units and the y-direction transparent electrode units that are positioned at the peripheral edge of these many transparent electrode units. Furthermore, adjacent y-direction electrode units are connected in the y direction by the y-direction connection unit that is arranged on the x-direction connection unit with an insulating layer therebetween. Then, the y-direction connection units are formed together with the outer periphery wiring by using the same material as the material of the outer periphery wiring.

CITATION LIST

Patent Literature

[PTL 1] Japanese Unexamined Patent Application Publication No. 2011-86122 (FIG. 1).

As portable information terminals including a touch panel of the related art such as that described above, in recent years, highly functional portable information terminals known as so-called smartphones have become widely popular. Then, in such a highly functional portable information terminal, the touch panel is formed as having an area that covers nearly the entire surface of the display screen.

Furthermore, such a highly functional portable information terminal is capable of implementing various processing operations and functions by using an application program being executed. In addition, the highly functional portable information terminal often includes one or plural function buttons as function buttons capable of being assigned with a function that is different for each of the application programs.

In the case of a highly functional portable information terminal of the related art, the function button is formed of a mechanical dome switch. When the dome switch is pressed by a user, an ON signal is generated, and the ON signal is transmitted as an interrupt signal to a CPU. Then, the CPU receiving the interrupt signal performs the function that has been assigned to the function button by using the application program being executed.

In recent years, in response to a request or the like regarding the design of highly functional portable information terminals, in place of a mechanical button such as a dome switch, a technique of assigning a function button function to a predetermined area on an electrostatic capacitance type touch panel, for example, realizing a function button function by using an electrostatic capacitance type touch key that is provided separately from the touch panel, has come to be adopted.

However, the technique of realizing function button functions by using a predetermined area of the touch panel and a touch key has a problem in that the terminal size, the cost, and constraint of button arrangement increase.

For example, in a case where a technique of assigning a function button function to a predetermined area on a touch panel is adopted, a touch panel having a large area size becomes necessary. That is, for example, in a case where a touch panel is a panel of an area size that covers only nearly the entire surface of the display screen, the predetermined area to which the function button is assigned overlaps the display area of the display screen. In this case, icons for showing the function buttons to a user, and various icons associated with the function button functions are displayed as images on the display screen. In this case, a part of the display area of the display screen is used for display of the icons of the function buttons. In other words, the display of the display screen is obstructed due to the display of the function buttons or the like. On the other hand, in order that the display of the display screen is not obstructed due to icon display of the function buttons or the like, it is necessary to extend the predetermined area of the touch panel to outside the display area of the display screen. That is, for this purpose, as described above, a touch panel having an area size larger than the display area of the display screen becomes necessary. In addition, in a case where this technique is adopted, the predetermined area to which the function button functions are assigned becomes only a certain predetermined area on the planar touch panel. Consequently, the degree of freedom of the arrangement of the function buttons becomes very low.

Furthermore, for example, in a case where a technique of realizing function button functions by using electrostatic capacitance type touch keys is adopted, the electrostatic capacitance type touch keys need to be newly provided separately from the touch panel and thus, the size of the highly functional portable information terminal increases. Furthermore, in a case where the technique is adopted, for example, a flexible printed substrate that is connected to an electrostatic capacitance type touch key or a CPU for touch keys mounted on the substrate become separately necessary, and the cost increases. In addition, a place where the electrostatic capacitance type touch keys are to be provided newly is limited to a certain degree, and it is difficult for the degree of freedom of the arrangement of the function buttons to remain high.

On the basis of the above, the inventors recognize the necessity that, in an electrostatic capacitance type touch panel device, for example, function button functions and the like are realized at a low cost and small size without obstructing display on a display screen, and a high degree of freedom is made possible regarding the arrangement positions thereof.

Furthermore, the inventors recognize the necessity that function button functions having a high degree of freedom of arrangement at a low cost and small size be realized and function button functions with ease of use for a user be realized in accordance with an application program being executed.

BRIEF SUMMARY

A touch panel device according to an embodiment is configured to include: an electrostatic capacitance type touch sensor in which a plurality of transparent electrode units are arranged in X and Y directions; a conductive layer that is connected to predetermined transparent electrode units among the plurality of transparent electrode units forming the electrostatic capacitance type touch sensor unit and that extends outward from an arrangement area of the plurality of transparent electrode units; a position detection unit that detects a position at which an external object contacts a surface near the electronic capacitance type touch sensor or the conductive layer; and a processor that executes a predetermined application program based on the position detected by the position detection unit.

A portable information terminal according to an embodiment is configured to include: a housing; an electrostatic capacitance type touch sensor unit in which a plurality of transparent electrode units are arranged in X and Y directions; a conductive layer that is connected to predetermined transparent electrode units among the plurality of transparent electrode units forming the electrostatic capacitance type touch sensor unit and that extends outward from an arrangement area of the plurality of transparent electrode units; a position detection unit that detects a position at which an external conductor approaches the electronic capacitance type touch sensor or the conductive layer; and a processor that executes a predetermined application program based on the position detected by the position detection unit.

In the portable information terminal according to an embodiment, when the approached position calculated by the position detection unit is an approached position based on the electrostatic capacitance change detection output by the predetermined transparent electrode units connected to the conductive layer, the processor executes a specific program included in the application program.

An operation control method for a portable information terminal according to an embodiment is a operation control method for a portable information terminal including: a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units; a position detection unit that calculates a position at which an external conductor has approached a surface of the touch panel section on the basis of an electrostatic capacitance change detection output of the electrostatic capacitance type touch sensor unit; and a program execution unit that executes a desired application program. In the operation control method according to the present embodiment, when the approached position calculated by the position detection unit is an approached position based on the electrostatic capacitance change detection output by the predetermined transparent electrode units connected to the conductive layer, the program execution unit executes a specific program included in the application program.

An operation control program for a portable information terminal according to an embodiment an operation control program for a portable information terminal including: a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units. The operation control program of the present embodiment, serving as a position detection unit that calculates a position at which an external conductor has approached a surface of the touch panel section on the basis of an electrostatic capacitance change detection output of the electrostatic capacitance type touch sensor unit, and a program execution unit that executes a desired application program, causes a computer of the portable information terminal to operate.

A recording medium according to an embodiment is a recording medium having recorded thereon an operation control program for a portable information terminal including a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units. The recording medium of the present embodiment has recorded thereon an operation control program, serving as a position detection unit that calculates a position at which an external conductor has approached a surface of the touch panel section on the basis of an electrostatic capacitance change detection output of the electrostatic capacitance type touch sensor unit, and a program execution unit that executes a desired application program, for causing a computer of the portable information terminal to operate.

That is, according to an embodiment, a conductive layer is connected to predetermined square transparent electrode units among a plurality of transparent electrode units forming an electrostatic capacitance type touch sensor unit. In addition, the conductive layer is provided outward from the area where the plurality of transparent electrode units are disposed. In other words, in an embodiment, the sensor area of the electrostatic capacitance type touch sensor unit is extended by an amount corresponding to the arrangement area of the conductive layer.

As a result, according to an embodiment, for example, in an electrostatic capacitance type touch panel device and a portable information terminal including the electrostatic capacitance type touch panel device, function button functions can be realized at a low cost and small size without obstructing the display on a display screen, and a high degree of freedom becomes possible regarding the arrangement positions thereof.

Furthermore, according to an embodiment, function button functions having a high degree of freedom of arrangement at a low cost and small size can be realized, and function button functions with ease of use for a user can be realized in accordance with an application program being executed.

BRIEF DESCRIPTION OF THE DRAWINGS

FIG. 9 is a schematic sectional view in which portions of a portable information terminal having the components of FIG. 8 are enlarged.

FIG. 22 is a view illustrating three (a total of 12) conductive print patterns provided at each of four sides of a window glass, and function button functions for each application.

FIG. 23 illustrates, in the form of a table, an example of function button functions that can be assigned to extended detection areas using conductive print patterns of FIG. 22 in several application program examples.

DETAILED DESCRIPTION

With reference to the drawings, as an embodiment, a description will be given below of an embodiment of an electrostatic capacitance type touch panel, a highly functional type portable information terminal including an electrostatic capacitance type touch panel that covers nearly the entire surface of a display screen, an operation control method and an operation control program for a highly functional portable information terminal including the electrostatic capacitance type touch panel, and a recording medium having the operation control program recorded thereon.

[Schematic Configuration of Electrostatic Capacitance Type Touch Panel]

Figure 1:
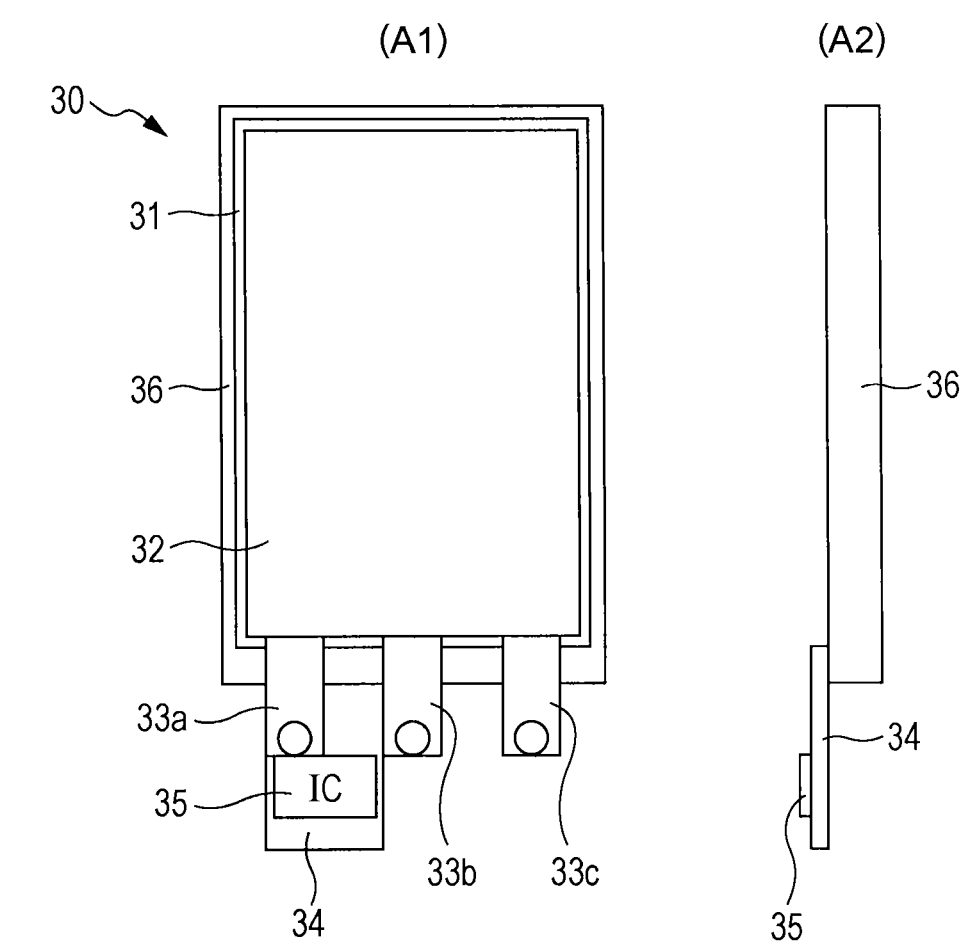
FIG. 1 illustrates a schematic configuration of an electrostatic capacitance type touch panel according to an embodiment, in which a conductive print pattern is capacitively coupled to the electrostatic capacitance type touch panel.
Figure 2:
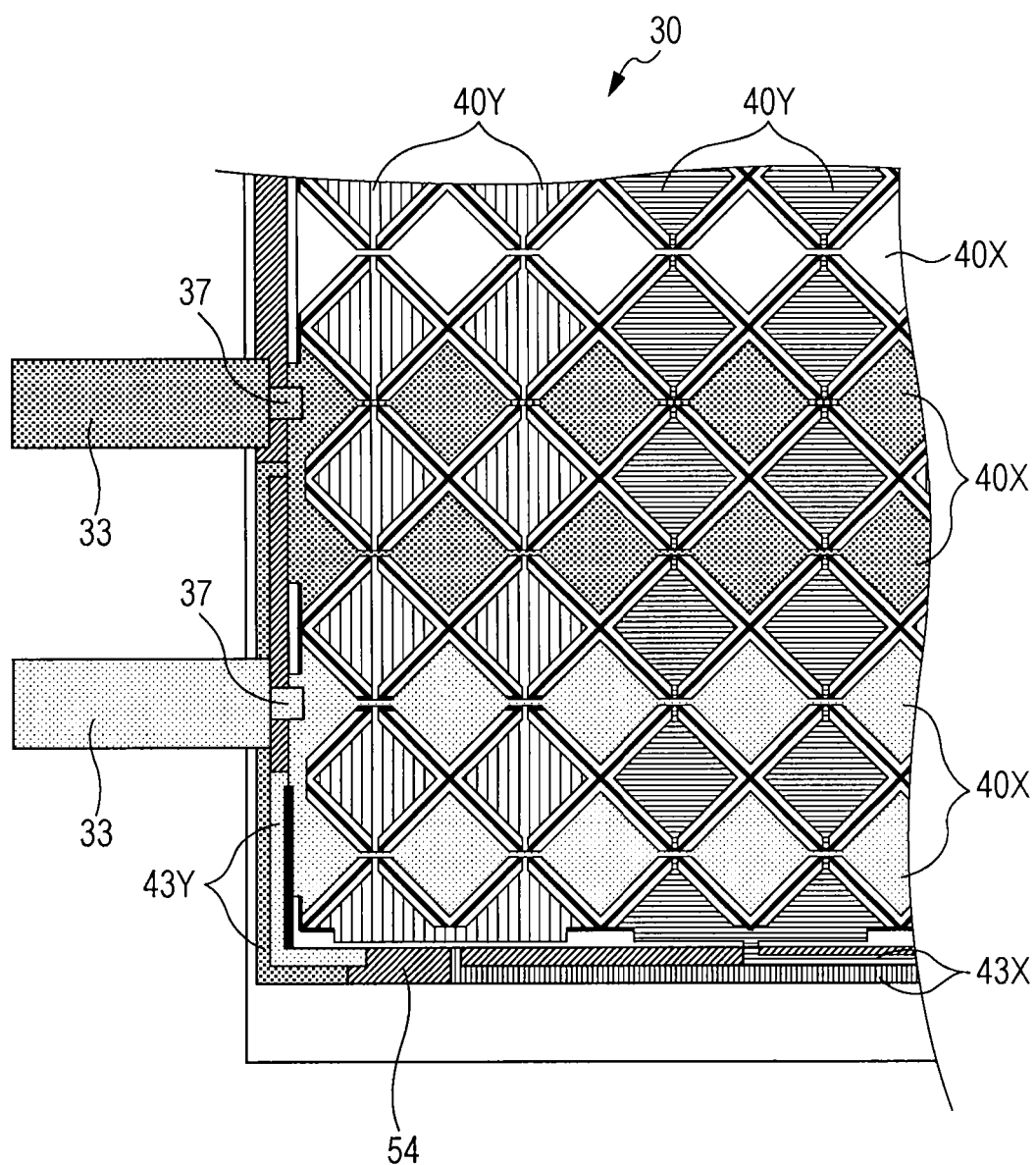
FIG. 2 schematically illustrates, in an enlarged manner, a portion in the neighborhood of a square transparent electrode unit of the electrostatic capacitance type touch panel according to the embodiment, and a conductive print pattern that is capacitively coupled thereto is enlarged.

FIG. 1 illustrates a schematic configuration of a touch panel section 30, which is an electrostatic capacitance type touch panel device according to an embodiment. Part (A1) of FIG. 1 is a front view of the touch panel section 30 of the present embodiment. Part (A2) of FIG. 1 is a side view of the touch panel section 30 of the present embodiment. FIG. 2 is a partially enlarged view of the touch panel section 30 of the present embodiment.

In FIG. 1, the touch panel section 30 of the present embodiment is configured to include, as the components thereof, a sensor glass part 36, an X-Y transparent electrode pattern part 31, a flexible printed substrate 34, an IC (integrated circuit) 35, a conductive print pattern 33 (33a, 33b, 33c) as an example of a conductive layer according to the embodiment, and the like.

The sensor glass part 36 is made of a transparent glass plate.

The X-Y transparent electrode pattern part 31 is formed on the surface of the sensor glass part 36. For example, as shown in FIG. 2, the X-Y transparent electrode pattern part 31 is formed in such a manner that a plurality of square transparent electrode units 40X are arranged in plural lines in the X direction, and a plurality of square transparent electrode units 40Y are arranged in plural lines in the Y direction.

In the square transparent electrode units 40X that are arranged in a plurality of lines in the X direction, adjacent square transparent electrode units 40X are connected by connection units. Similarly, in the square transparent electrode units 40Y that are arranged in a plurality of lines in the Y direction, adjacent square transparent electrode units 40Y are connected by connection units. The connection units that connect between the adjacent square transparent electrode units 40X, and the connection units that connect between the adjacent square transparent electrode units 40Y are each formed from a transparent electrode.

Furthermore, each square transparent electrode unit 40X of one of the outermost edge portions among the square transparent electrode units 40X is connected to the outer edge wiring pattern 43X, and is connected to the wiring pattern of the flexible printed substrate 34 through the outer edge wiring pattern 43X. Similarly, the square transparent electrode unit 40Y of one of the outermost edge portions among the square transparent electrode units 40Y is connected to the outer edge wiring pattern 43Y, and is connected to the wiring pattern of the flexible printed substrate 34 through the outer edge wiring pattern 43Y.

The flexible printed substrate 34 is formed as having wiring patterns that are correspondingly connected to the outer edge wiring pattern 43X and the outer edge wiring pattern 43Y of the X-Y transparent electrode pattern part 31. In the example of FIG. 1, the flexible printed substrate 34 is depicted in a state of being extended in the plane. However, when the touch panel section 30 of the present embodiment is disposed, for example, in a housing of a portable information terminal, the touch panel section 30 is, for example, bent and arranged at a predetermined position inside the housing of the portable information terminal.

The IC 35 is mounted on the flexible printed substrate 34, and is connected to the outer edge wiring pattern 43X and the outer edge wiring pattern 43Y of the X-Y transparent electrode pattern part 31 through the wiring pattern on the flexible printed substrate 34. The IC 35 calculates a coordinate value and an electrostatic capacitance detection value when, for example, an external conductor, such as a finger of a user, has approached the sensor surface of the touch panel section 30 by scanning each square transparent electrode unit 40X in the X direction and each square transparent electrode unit 40Y in the Y direction of the X-Y transparent electrode pattern part 31 and by detecting a change in the electrostatic capacitance in the X direction and in the Y direction.

In the description of the present embodiment, approach of an external conductor, such as a finger of a user, with respect to the sensor surface will be referred to as a "touch".

Although the details will be described later, in the touch panel section 30 of the present embodiment, the conductive print pattern 33 (33a, 33b, 33c) is a thin conductive print layer that is formed on, for example, the plate surface of a window glass or the flexible printed substrate by, for example, screen printing. As shown in, for example, FIG. 2, these conductive print patterns 33 are capacitively coupled to the predetermined square transparent electrode unit 40X of the outermost edge portion among the square transparent electrode units 40X or to the predetermined square transparent electrode unit 40Y of the outermost edge portion among the square transparent electrode units 40Y. In the example of FIG. 2, in order to facilitate the viewing of the figure, the size of the conductive print pattern 33 in the figure is depicted comparatively small with respect to the size of each square transparent electrode unit 40X and each square transparent electrode unit 40Y in the figure. However, as shown in FIG. 1, the original size of the conductive print pattern 33 is larger than those of the square transparent electrode units 40X and 40Y.

Although the details will be described later, in the touch panel section 30 of the present embodiment, the conductive print pattern 33 is arranged so as to extend in a direction nearly parallel to the plane of the X-Y transparent electrode pattern part 31 and to the outward of the X-Y transparent electrode pattern part 31 as in, for example, FIGS. 1 and 2. Also, for example, the conductive print pattern 33 may be arranged so as to extend to the outward of the X-Y transparent electrode pattern part 31 while being bent in a direction at right angles to the plane of the X-Y transparent electrode pattern part 31 or in a direction at a desired angle direction other than the right angles, or may be arranged so as to extend in a curved manner.

In addition, in the case of the present embodiment, an auxiliary wiring pattern 37 for assisting capacitive coupling between those conductive print patterns 33 and the predetermined square transparent electrode unit 40X of the outer edge portion or the predetermined square transparent electrode unit 40Y of the outer edge portion are also correspondingly formed.

As described above, the touch panel section 30 of the present embodiment includes the conductive print pattern 33 shown in FIGS. 1 and 2, or the conductive print pattern 33 that is arranged so as to extend at a desired direction or in a curved manner with respect to the plane of the X-Y transparent electrode pattern part 31. Those conductive print patterns 33 are capacitively coupled to the predetermined square transparent electrode units of the outermost edge portions of the square transparent electrode units 40X and 40Y. For this reason, according to the touch panel section 20 of the present embodiment, when, for example, a touch is made using an external conductor on the conductive print pattern 33, it is possible to detect a touch using the external conductor through predetermined square transparent electrode units that are capacitively coupled to those conductive print patterns 33. In other words, in the touch panel section 30 of the present embodiment, the detection area of the X-Y transparent electrode pattern part 31 is extended by the conductive print pattern 33.

Figure 3:
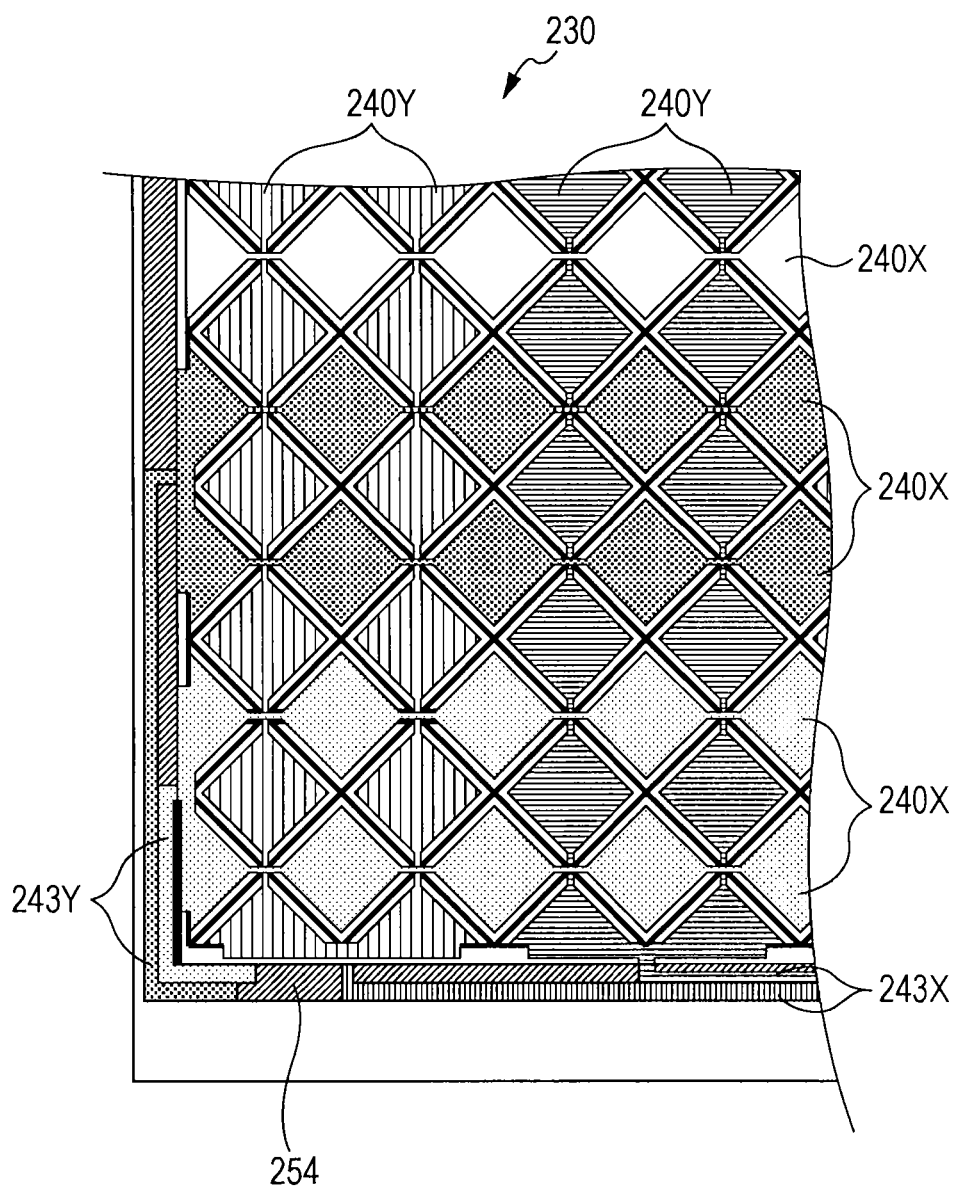
FIG. 3 illustrates, as a comparison example with respect to the touch panel section of the present embodiment shown in FIG. 2, a schematic configuration of a touch panel section not including a conductive print pattern part that is capacitively coupled to an X-Y transparent electrode pattern part.

FIG. 3 illustrates, as a comparison example for the touch panel section 30 of the present embodiment shown in FIG. 2, a schematic configuration of a touch panel section 230 not having a conductive print pattern that is capacitively coupled to an X-Y transparent electrode pattern part 231.

The touch panel section 230 shown in the comparison example of FIG. 3 is configured to include, as the components thereof, a sensor glass part 236, an X-Y transparent electrode pattern part 231, a flexible printed substrate 234, and an IC (integrated circuit) 235, and does not include the conductive print pattern 33 shown in FIG. 2. The X-Y transparent electrode pattern part 231 includes a plurality of square transparent electrode units 240X that are arranged in the X direction, and a plurality of square transparent electrode units 240Y that are arranged in the Y direction, and is formed in such a manner that adjacent square transparent electrode units 240X are connected correspondingly by connection units, and adjacent square transparent electrode units 240Y are connected correspondingly by connection units. Furthermore, in the case of the comparison example of FIG. 3, the square transparent electrode unit 240X of the outermost edge portion is connected to an outer edge wiring pattern 243X, the square transparent electrode unit 240Y of the outermost edge portion is connected to an outer edge wiring pattern 243Y, and the outer edge wiring patterns 243X and 243Y are connected to the wiring pattern of the flexible printed substrate.

In the case of the configuration of the comparison example of FIG. 3, since the touch panel section 230 does not include the conductive print pattern 33 shown in FIG. 2, an area in which a touch using an external conductor, such as a finger of the user, can be detected is only the area of the X-Y transparent electrode pattern part 231.

[Schematic Configuration of Portable Information Terminal Including Electrostatic Capacitance Type Touch Panel]

Figure 4:
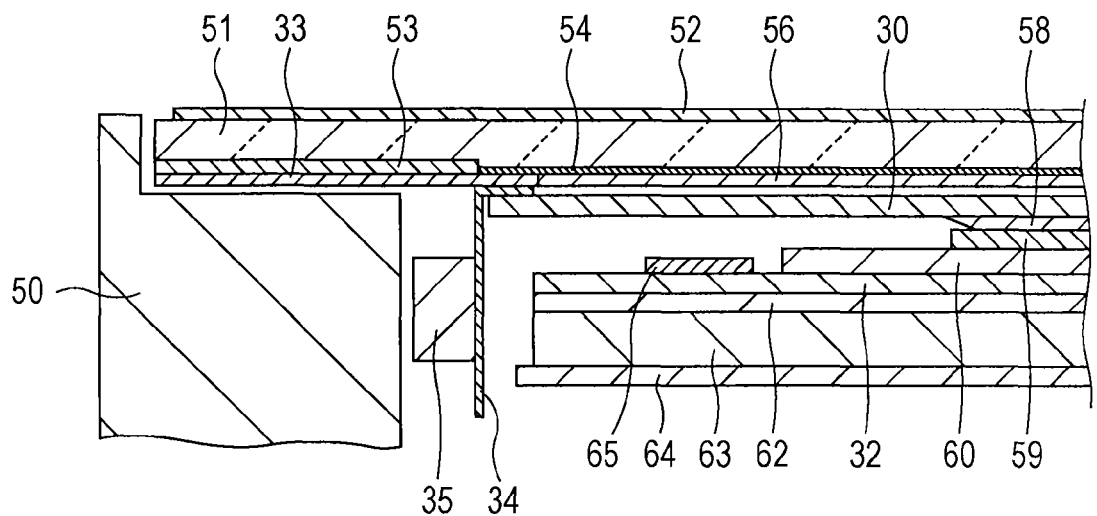
FIG. 4 is a schematic sectional view in which, in a portable information terminal of the present embodiment, only portions in the vicinity of an end portion in which a conductive print pattern part that is arranged so as to extend in a direction nearly parallel to the plane of the X-Y transparent electrode pattern part, a flexible printed substrate, and an IC are arranged are enlarged.
Figure 5:
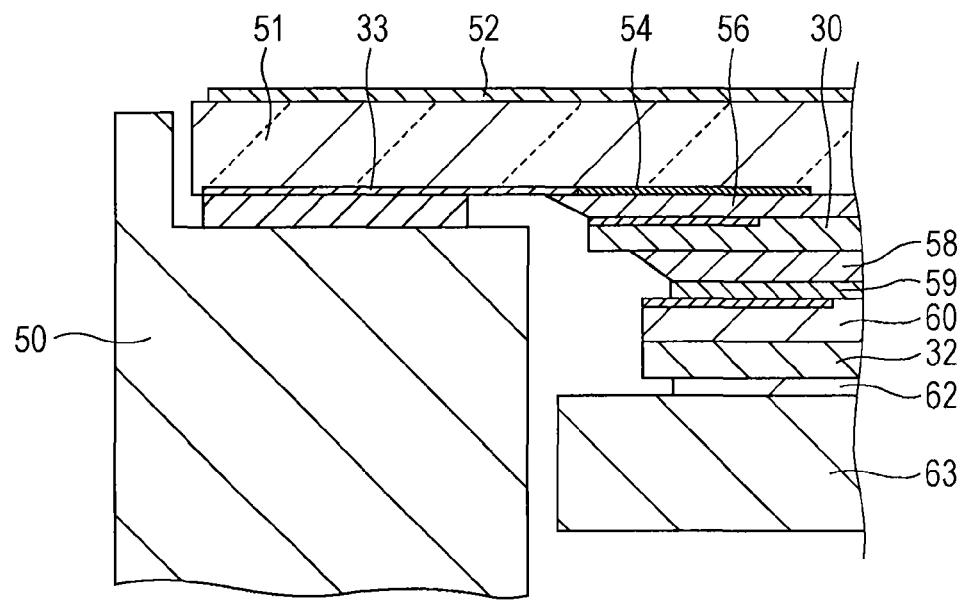
FIG. 5 is a schematic sectional view in which, in the portable information terminal, only a portion near an end portion in which a flexible printed substrate and an IC are not arranged is enlarged.
Figure 6:
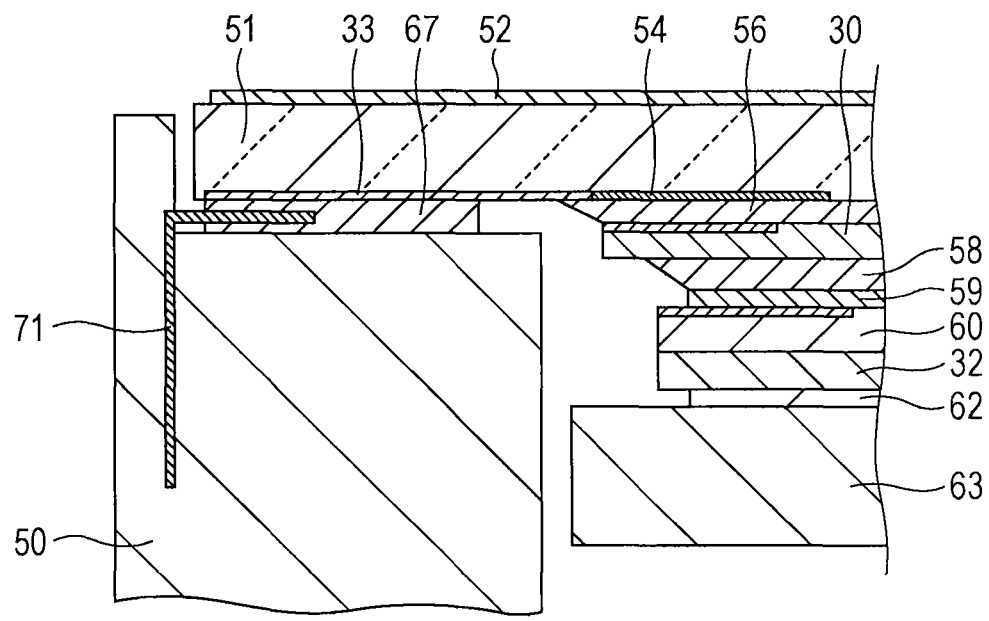
FIG. 6 is a schematic sectional view in which, in the portable information terminal of the present embodiment, only a portion in the vicinity of an end portion in which a conductive print pattern part that extends in such a manner as to be bent in a direction at nearly right angles to the plane of the X-Y transparent electrode pattern part is enlarged.

FIGS. 4 to 6 illustrate a schematic configuration of the portable information terminal of the present embodiment including the above-mentioned conductive print pattern 33.

FIG. 4 illustrates a schematic cross section in which only a portion in the vicinity of an end portion in which the conductive print pattern part 30 that is arranged so as to extend in a direction nearly parallel to the plane of the X-Y transparent electrode pattern part 31 and to the outward of the X-Y transparent electrode pattern part 31, the flexible printed substrate 34, and the IC 35 are arranged as in the above-mentioned example of FIGS. 1 and 2, is enlarged.

FIG. 5 illustrates a schematic cross section in which only a portion in the vicinity of an end portion in which the flexible printed substrate 34 of the touch panel section 30 and the IC 35 are not arranged is enlarged.

FIG. 6 illustrates a schematic cross section in which only a portion in the vicinity of an end portion in which the conductive print pattern part 30 that is bent, for example, in a direction at right angles to the plane of the X-Y transparent electrode pattern part 31 and that extends to the outward of the X-Y transparent electrode pattern part 31 is arranged is enlarged.

However, in FIGS. 4 to 6, for simplification of the figures, illustration of hatching or the like showing a cross section is omitted. Furthermore, in the example of FIG. 4, a state in which the mounted flexible printed substrate 34 of the IC 35 is bent so as to be contained at a predetermined position inside the housing of the portable information terminal is shown.

In FIGS. 4 to 6, a window glass 51 is mounted in the housing of the portable information terminal of the present embodiment by pasting the outer edge portion or the like using a laminate part 67 formed of, for example, a both-sided adhesive on a predetermined window arrangement part of the terminal housing 50.

A so-called anti-static film 52 is pasted on the outer side plane of the window glass 51.

Furthermore, on the inner side of the housing of the window glass 51, a black screen 54 that does not shield the display surface of the display unit 32 (to be described later) and satisfies demand regarding the terminal design is printed or the like.

Furthermore, in the present embodiment, on the inner side of the housing of the window glass 51, the conductive print pattern 33 shown in FIGS. 1 and 2 is formed by, for example, screen printing.

The display unit 32 is formed of, for example, a liquid-crystal display, and the display thereof is driven and controlled by a display IC 65. The display unit 32 is arranged inside the portable information terminal of the present embodiment and at a position at which the effective display surface thereof is not shielded by the black screen 54 of the window glass 51.

Furthermore, on the plane side of the display 32 in the outward direction side of the housing, a polarized plate 59 and a color filter 60 are arranged, and additionally, on the plane side of the display 32, which is on the inward direction side of the housing, a polarized plate 62 and a backlight unit 63 are arranged. The backlight unit 63 is arranged on a backlight frame 64.

The touch panel section 30 is provided at a position at which the touch panel section 30 is sandwiched between the window glass 51 and the display unit 32 with a transparent laminate film 58 and a transparent laminate film 56 in between.

Then, in the case of the present embodiment, the touch panel section 30 is arranged so as to satisfy the positional relationship in which, as described above, the predetermined square transparent electrode unit of the outermost edge portion of each of the square transparent electrode units 40X and 40Y can be capacitively coupled to the conductive print pattern 33.

As can be seen from FIGS. 4 to 6, according to the portable information terminal of the present embodiment, a touch using an external conductor, such as a finger of a user, can be detected not only in the detection area using the X-Y transparent electrode pattern part 31 of the touch panel section 30, but also in the area in which the conductive print pattern 33 is arranged.

Figure 7:
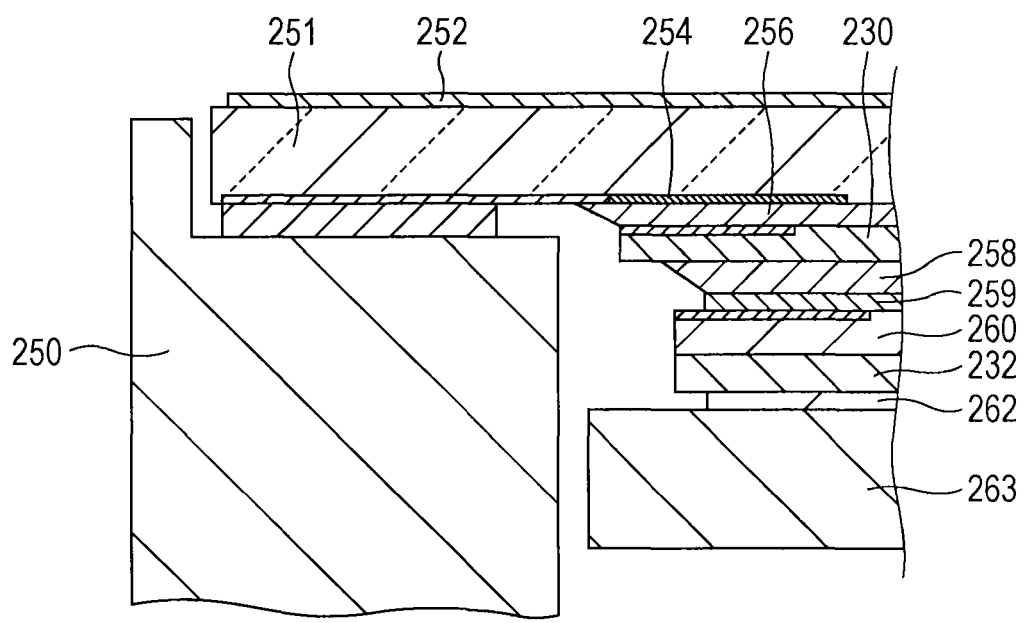
FIG. 7 is a sectional view in which, as a comparison example with respect to the portable information terminal of the present embodiment, only a portion in the vicinity of an end portion of a touch panel section not having a conductive print pattern is enlarged.

FIG. 7 illustrates, as a comparison example with respect to the portable information terminal of the present embodiment, a schematic cross section in which only a portion in the vicinity of an end portion of the touch panel section 230 not having the conductive print pattern 33 such as that described above is enlarged.

In the comparison example shown in FIG. 7, a window glass 251 includes only an anti-static film 252 and the black screen 54, and does not have a conductive print pattern such as that described above.

A display unit 232 is formed of, for example, a liquid-crystal display. On the plane side in the outward direction of the housing, a polarized plate 259 and a color filter 260 are arranged, and on the plane side in the inward direction of the housing, a polarized plate 262 and a backlight unit 263 are arranged. The backlight unit 263 is arranged on a backlight frame 264.

The touch panel section 230 is provided at a position at which the touch panel section 230 is sandwiched between the window glass 251 and the display unit 232 with a transparent laminate film 258 and a transparent laminate film 256 in between.

In the case of the comparison example of FIG. 7, since the touch panel section 230 does not include the conductive print pattern 33 such as that described above, an area where a touch using an external conductor, such as a finger of a user, can be detected is only the area of the X-Y transparent electrode pattern part 231.

[Use of Extended Detection Area Using Conductive Print Pattern and Advantages Thereof]

As described above, in a case where the detection area of the X-Y transparent electrode pattern part 31 is extended using the conductive print pattern 33, as an example, the extended detection area using the conductive print pattern 33 can be assigned to a function button function or the like.

A description will be given below, with reference to FIGS. 8 and 9, of the difference between the advantages in a case where an extended detection area using the above-mentioned conductive print pattern 33 is assigned to a function button function and in a case where, as a comparison example thereof, the conductive print pattern 33 is not provided, for example, the detection area itself of the touch panel is extended, and a function button function is assigned to the detection area or in a case where a function button function is realized using an electrostatic capacitance type touch key provided separately from the touch panel.

Figure 8:
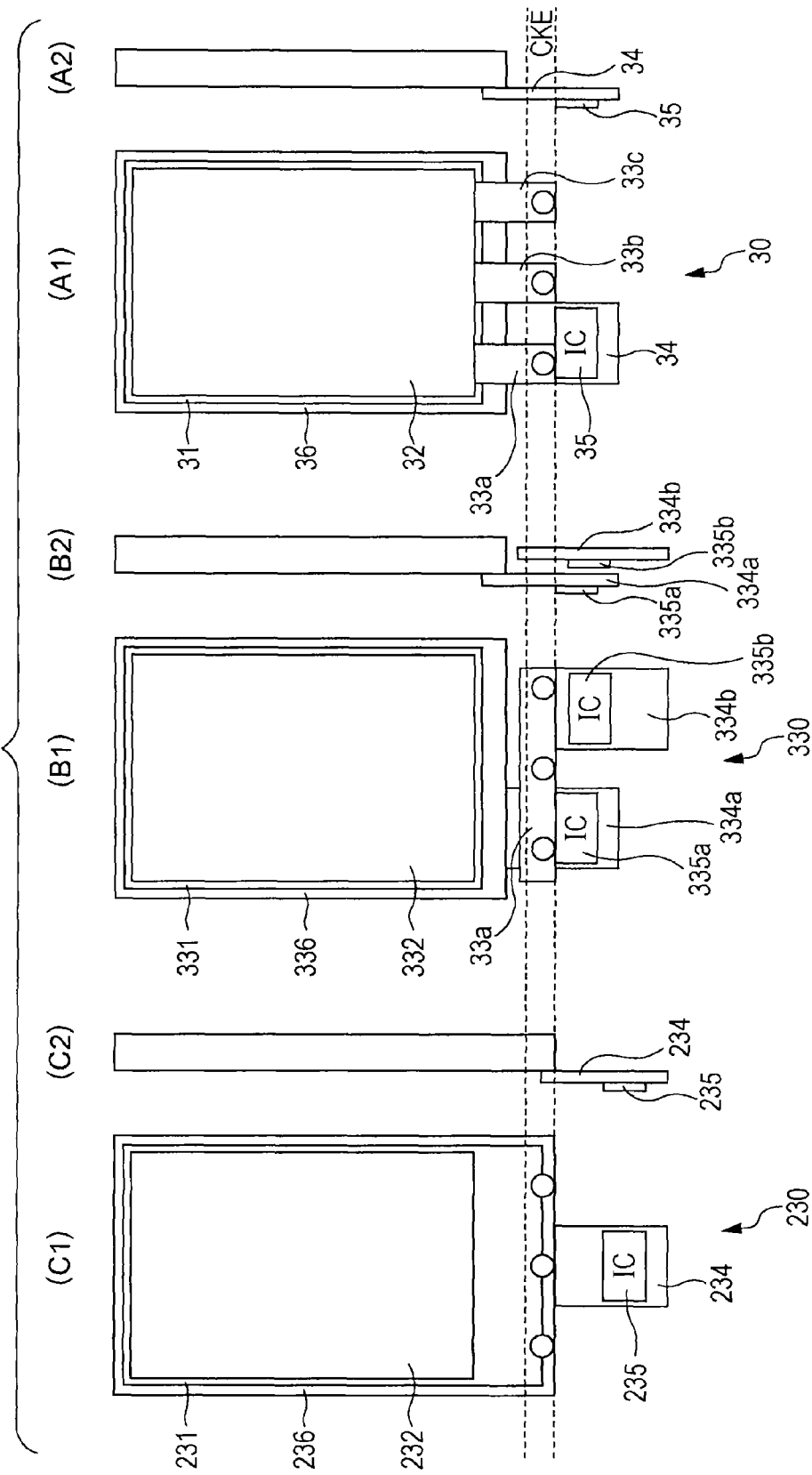
FIG. 8 illustrates a touch panel section of the present embodiment, a touch panel section of the comparison example, in which the detection area of the touch panel is extended and function button functions are assigned thereto, and a touch panel section of the comparison example in which function button functions are realized by using an electrostatic capacitance type touch key.
Figure 10A:
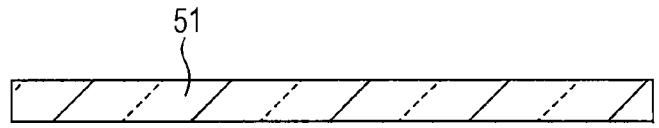
FIG. 10 includes views illustrating a processing flow when a touch panel section to which a conductive print pattern is capacitively coupled, and the portable information terminal of the present embodiment including the touch panel section are manufactured.
Figure 10B:
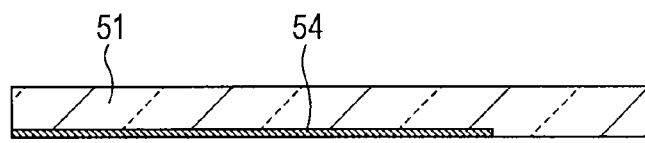
Figure 10C:
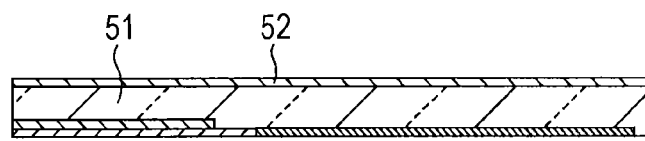
Figure 10D:
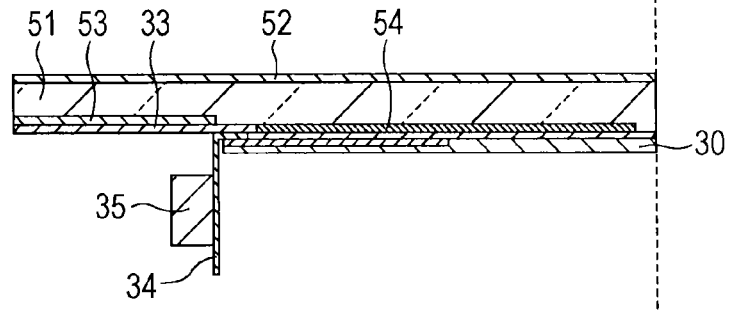
Figure 10E:
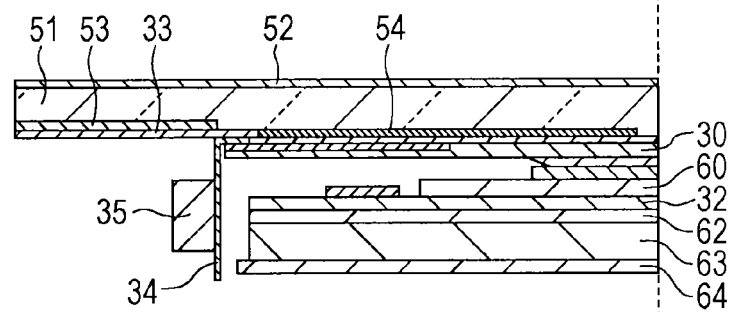
Figure 10F:
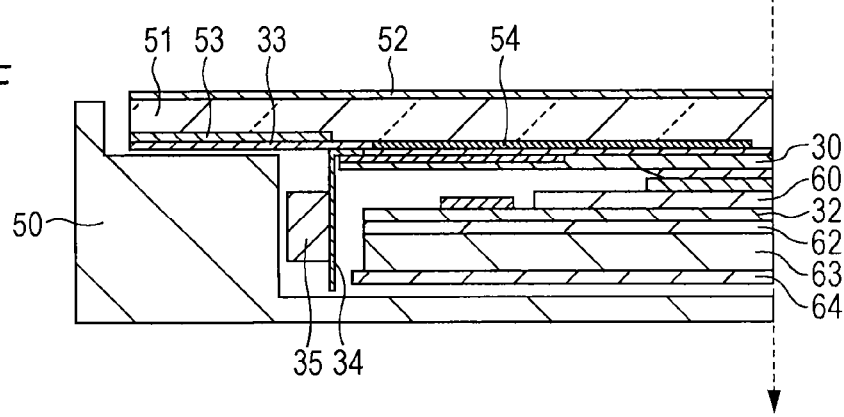

Parts (A1) and (A2) of FIG. 8 and part (A) of FIG. 9 illustrate a schematic configuration of the touch panel section 30 having the conductive print pattern 33 of the present embodiment shown in FIG. 1, and a portable information terminal.

Parts (C1) and (C2) of FIG. 8 and part (C) of FIG. 9 illustrate, as a comparison example with respect to parts (A1) and (A2) of FIG. 8, and part (A) of FIG. 9, a schematic configuration of the touch panel section 230 and a portable information terminal in a case where the conductive print pattern 33 is not provided, for example, the detection area itself of the touch panel is extended, and a function button function is assigned to the detection area.

Parts (B1) and (B2) of FIG. 8 and part (B) of FIG. 9 illustrate, as a comparison example with respect to parts (A1) and (A2) of FIG. 8 and part (A) of FIG. 9, the outline configuration of the touch panel section 330 and the portable information terminal in a case where the conductive print pattern 33 is not provided, and, for example, a function button function is realized using an electrostatic capacitance type touch key that is provided separately from the touch panel.

Parts (A1) and (A2) of FIG. 8 and part (A) of FIG. 9 are the same as FIG. 1 and FIG. 4, and accordingly, the descriptions of the components are omitted.

In the case of the touch panel section 230 and the portable information terminal of the example of parts (C1) and (C2) of FIG. 8 and part (C) of FIG. 9, which is a comparison example with respect to parts (A1) and (A2) of FIG. 8 and part (A) of FIG. 9, the touch panel section 230 is configured to include, as the components thereof, a sensor glass part 236, an X-Y transparent electrode pattern part 231, a flexible printed substrate 234, and an IC 235. Furthermore, in the portable information terminal including the touch panel section 230, the window glass 251 includes only an anti-static film 252 and a black screen 254. On the plane side of the display unit 232 in the outward direction of the housing, a polarized plate 259 and a color filter 260 are arranged, and on the plane side of the display unit 232 in the inward direction of the housing, a polarized plate 262 and a backlight unit 263 are arranged. The backlight unit 263 is arranged on the backlight frame 264. Furthermore, the touch panel section 230 is provided at a position at which the touch panel section 230 is sandwiched between the window glass 251 and the display unit 232 with a transparent laminate film 258 and a transparent laminate film 256 in between.

Here, in the case of the example of parts (C1) and (C2) of FIG. 8 and part (C) of FIG. 9, the size of the touch panel section 230 is increased by an amount corresponding to a predetermined area CKE to which the function button function is assigned. That is, with respect to the configuration of the present embodiment shown in parts (A1) and (A2) of FIG. 8 and part (A) of FIG. 9, in the case of the configuration of the comparison example shown in parts (C1) and (C2) of FIG. 8 and part (C) of FIG. 9, the size of the touch panel section 230 is increased by an amount corresponding to the predetermined area CKE to which the function button function is assigned. For this reason, in the case of the comparison example, a large panel becomes necessary for the touch panel section 230. Furthermore, the area to which a function button function can be assigned is only the predetermined area CKE, and the degree of freedom of arrangement of the function buttons is limited.

Furthermore, in the touch panel section 330 and the portable information terminal of the example of parts (B1) and (B2) of FIG. 8 and part (B) of FIG. 9, which is a comparison example with respect to parts (A1) and (A2) of FIG. 8 and part (A) of FIG. 9, the touch panel section 330 is configured to include, as the components thereof, a sensor glass part 336, an X-Y transparent electrode pattern part 331, a flexible printed substrate 334a, and an IC 335a. Furthermore, in the portable information terminal including the touch panel section 330, a window glass 351 includes only an anti-static film 352 and a black screen 354. On the plane side of the display unit 332 in the outward direction of the housing, a polarized plate 359 and a color filter 360 are arranged, and on the plane side of the display unit 332 in the inward direction of the housing, a polarized plate 362 and a backlight unit 363 are arranged. The backlight unit 363 is arranged on the backlight frame 364. Furthermore, the touch panel section 330 is provided at a position at which the touch panel section 330 is sandwiched between the window glass 351 and the display unit 332 with a transparent laminate film 358 and a transparent laminate film 356 in between.

Here, in the case of the example of parts (B1) and (B2) of FIG. 8 and part (B) of FIG. 9, the touch panel section 330 includes an electrostatic capacitance type touch key 331b, an IC 335b, and a flexible printed substrate 334b for realizing a function button function. That is, with respect to the configuration of the present embodiment shown in parts (A1) and (A2) of FIG. 8 and part (A) of FIG. 9, in the case of the configuration of the comparison example shown in parts (B1) and (B2) of FIG. 8 and part (B) of FIG. 9, the housing size is increased by an amount corresponding to the electrostatic capacitance type touch keys 331b, the IC 335b, and the flexible printed substrate 334b for realizing the function button function, and furthermore, the cost is increased by an amount corresponding to that those are added. Furthermore, the positions at which the electrostatic capacitance type touch key 331b, the IC 335b, and the flexible printed substrate 334b are arranged are limited to a certain degree, and consequently, the degree of freedom of arrangement of the function buttons is also limited.

In contrast, in the case of the configuration of the present embodiment shown in parts (A1) and (A2) of FIG. 8 and part (A) of FIG. 9, the size of the housing can be prevented from becoming larger, and the cost is hardly increased compared to the configuration of parts (B1) and (B2) of FIG. 8, part (B) of FIG. 9, parts (C1) and (C2) of FIG. 8, and part (C) of FIG. 9. In addition, in the case of the present embodiment, the conductive print pattern 33 may be arranged at any place as long as the conductive print pattern 33 can be capacitively connected to the predetermined square transparent electrode unit of the X-Y transparent electrode pattern part 31. Since the degree of freedom of arrangement is very high, the limitation in the arrangement place of the function button is very small.

[Processing at Time of Manufacture of Touch Panel Section and Terminal of Present Embodiment]

FIG. 10 is a processing flow when the touch panel section 30 to which the above-mentioned conductive print pattern 33 is capacitively coupled and a portable information terminal including the touch panel section 30 are manufactured.

In the manufacturing process of the present embodiment, as a first step, the window glass 51 is prepared as shown in part (A) of FIG. 10. Next, as a second step, as shown in part (B) of FIG. 10, the black screen 54 is printed and formed on the inner plane side of the housing.

Next, as a third step, as shown in part (C) of FIG. 10, for example, an icon 53 or the like is printed on the inner plane side of the housing of the window glass 51 and also, the conductive print pattern 33 is printed. Furthermore, the anti-static film 52 is formed or pasted on the outer plane side of the window glass 51.

Next, as a fourth step, as shown in part (D) of FIG. 10, on the inner side of the housing with respect to the window glass 51, a touch panel unit constituted by the touch panel section 30, the flexible printed substrate 34, and the IC 35 is arranged.

Next, as a fifth step, as shown in part (E) of FIG. 10, on the inner side of the housing with respect to the touch panel unit, the polarized plate 59, the color filter 60, the display unit 32, the polarized plate 62, the backlight unit 63, and the like are arranged.

Finally, as a sixth step, as shown in part (F) of FIG. 10, the components that are manufactured after undergoing the first to fifth steps are housed and arranged inside the housing 50 of the portable information terminal.

[Schematic Exterior Configuration Example of Portable Information Terminal]

Figure 11:
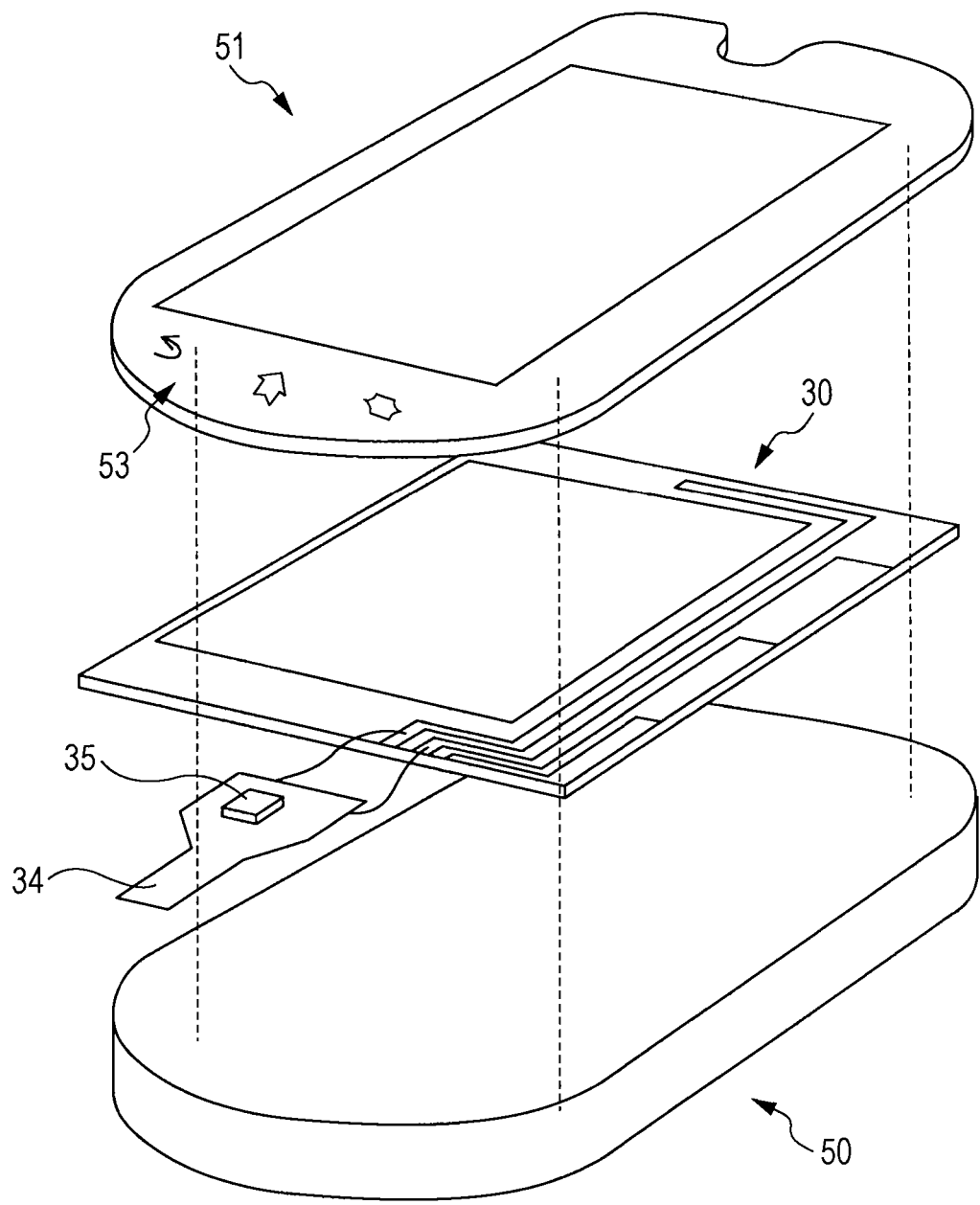
FIG. 11 is a schematic exploded perspective view of a window glass having a conductive print pattern that is arranged so as to extend in a direction nearly parallel to the plane of the X-Y transparent electrode pattern part, a touch panel section, and a terminal housing on which those are arranged.
Figure 12:
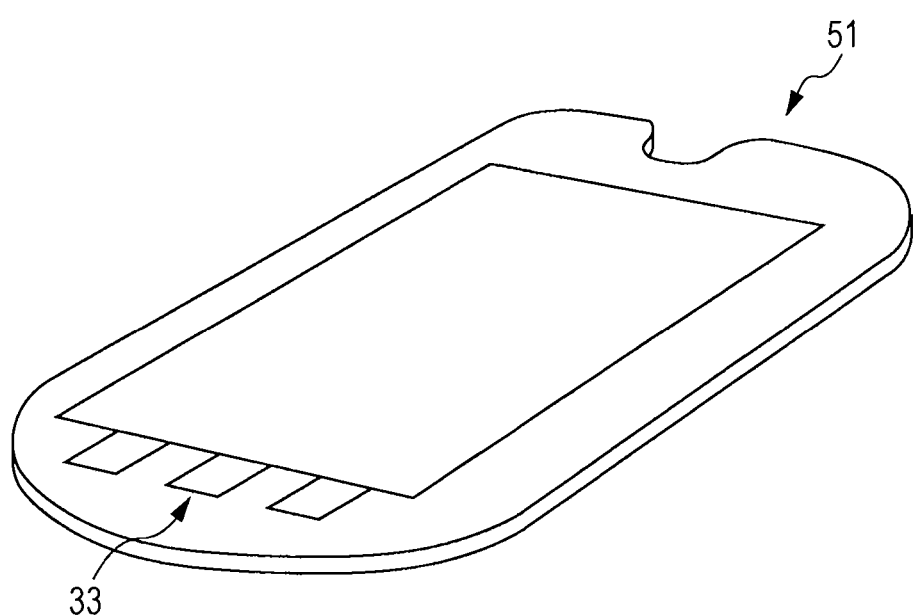
FIG. 12 is a perspective view when the window glass shown in FIG. 11 is viewed from the reverse surface side (housing inner side).

FIGS. 11 and 12 illustrate a schematic exploded perspective views of the window glass 51 having the conductive print pattern 33 that is arranged so as to extend in a direction nearly parallel to the plane of the X-Y transparent electrode pattern part 31 and to the outward of the X-Y transparent electrode pattern part 31, the touch panel section 30 to which the flexible printed substrate 34 and the IC 35 are connected, and the terminal housing 50 on which those are arranged, as in the above-mentioned examples of FIGS. 1 and 2. FIG. 12 is a perspective view when the window glass 51 is viewed from the reverse surface side (the housing inner side).

In FIGS. 11 and 12, on the window glass 51, the black screen 54 is printed, and the icon 53 and the conductive print pattern 33 are also printed. Then, the touch panel section 30 is housed inside the housing 50, and the window glass 51 is mounted in the housing 50 in which the touch panel section 30 is housed, thereby forming the portable information terminal of the present embodiment.

[Example of Extension of Extended Detection Area to Side Surface Part of Housing]

Figure 13:
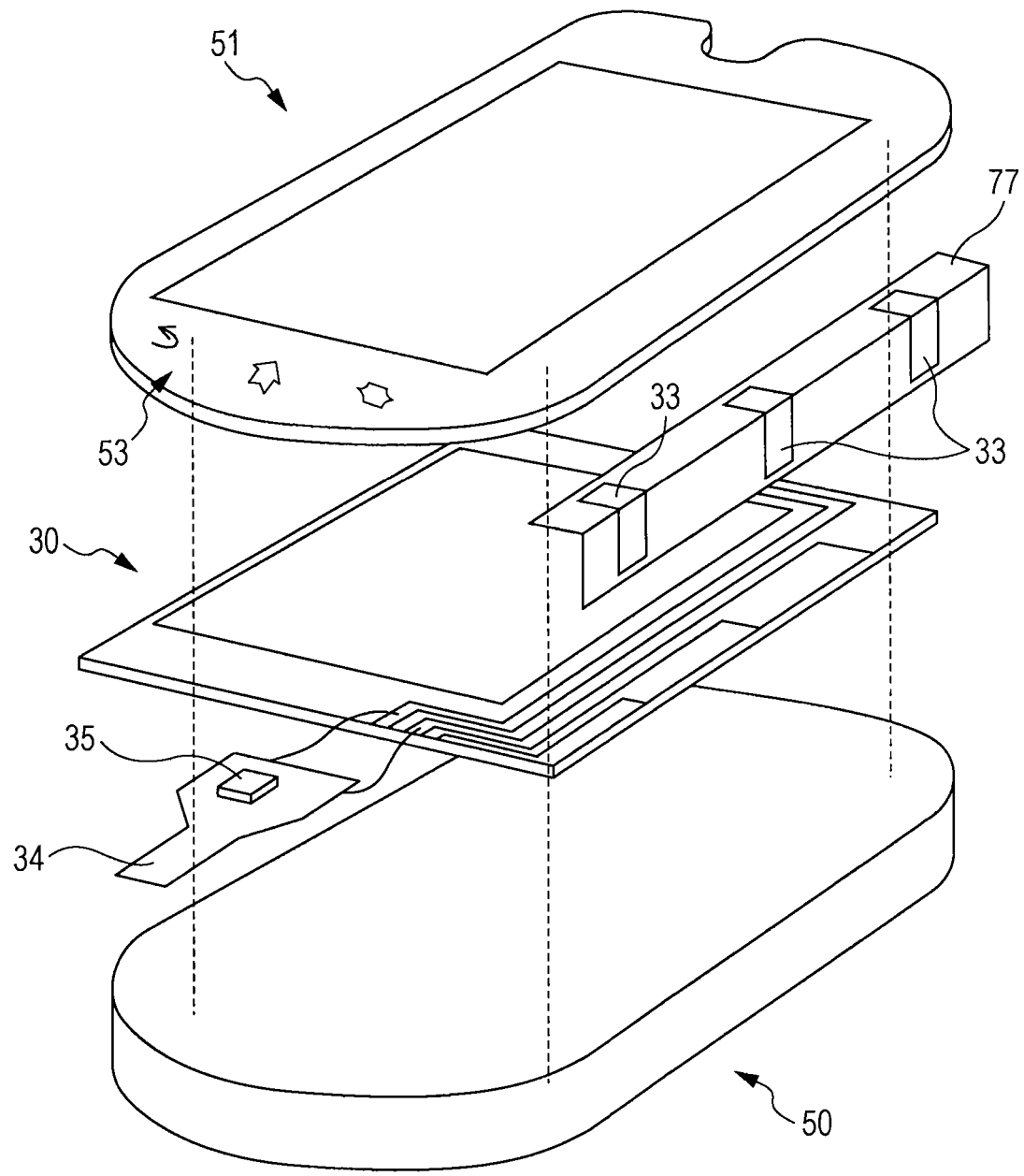
FIG. 13 is a schematic exploded perspective view of a terminal housing on which a pattern extended substrate having a conductive print pattern that is arranged so as to extend in such a manner as to be bent in a direction nearly at right angles to the plane of the X-Y transparent electrode pattern part, a window glass, and a touch panel section are arranged.

FIG. 13 illustrates a schematic exploded perspective view of a pattern extended substrate 71 for realizing the conductive print pattern 33 that is, for example, bent nearly at right angles to the plane of the X-Y transparent electrode pattern part 31 and arranged so as to extend to the outward of the X-Y transparent electrode pattern part 31, the window glass 51, the touch panel section 30 to which the flexible printed substrate 34 and the IC 35 are connected and, the terminal housing 50 on which those are arranged, as in the above-mentioned example of FIG. 6.

In the example of the configuration of FIG. 13, on the window glass 51, the black screen 54 is printed, and the icon 53 is also printed. The touch panel section 30 is housed in the housing 50.

Here, in the case of the configuration example of FIG. 13, the pattern extended substrate 71 is formed of, for example, a rectangular flexible printed substrate, and the conductive print pattern 33 is formed on the substrate. Then, the pattern extended substrate 71 is arranged in the terminal housing 50, for example, in such a manner as to be bent nearly at right angles. That is, the portable information terminal of the present embodiment is assembled in such a manner that in a state in which one of the end portions of the conductive print pattern 33 that is bent nearly at right angles in accordance with the bending of the pattern extended substrate 71 is capacitively coupled to the predetermined transparent electrode pattern part of the touch panel section 30, the other end portion of the conductive print pattern 33 is arranged so as to be positioned in the side wall surface part of the terminal housing 50.

As a result, the portable information terminal of FIG. 13 is such that when, for example, an external conductor, such as a finger of a user, has touched in the side wall surface part area of the terminal housing 50, on which the conductive print pattern 33 is arranged, an extended detection area in which the touch can be detected is formed.

[Example of Arrangement of Plurality of Extended Detection Areas]

Figure 14:
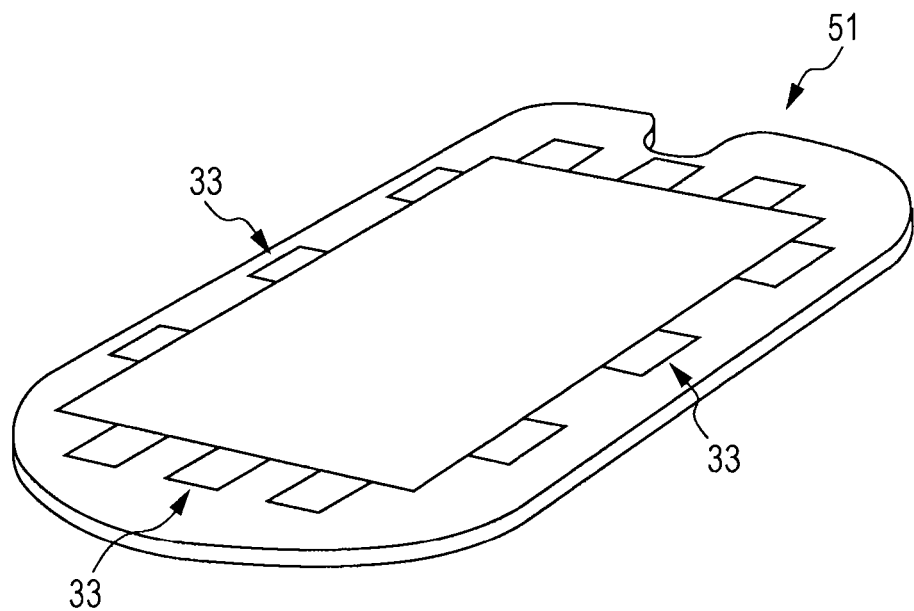
FIG. 14 is a perspective view illustrating a configuration example in a case where three (a total of 12) conductive print patterns are provided at each of four sides of the window glass.

FIG. 14 illustrates an example of a configuration in a case where, for example, three (a total of 12) conductive print pattern 33 is provided in each of four sides of the window glass 51. In the case of the example of FIG. 14, each conductive print pattern 33 is capacitively coupled to the predetermined transparent electrode pattern part at a corresponding position on the touch panel section 30.

As a result, in the portable information terminal of the example of FIG. 14, the detection area of the touch panel section 30 can be extended using the conductive print pattern in, for example, four sides of the window glass 51.

In a case where conductive print patterns are provided in four sides of the window glass 51 as in the example of FIG. 14, it is also possible that, for example, four pattern extended substrates 71 similar to those of FIG. 13 are prepared, and those pattern extended substrates 71 are arranged correspondingly in the respective four sides of the window glass 51. In this case, it becomes possible for the portable information terminal to detect a touch in four side wall surface areas of the housing.

[Example of Addition of Illumination Function to Extended Detection Area of Present Embodiment]

The portable information terminal of the present embodiment is formed in such a manner that the touch detection area of the touch panel section 30 is extended using the extended detection area as described above and, for example, a function button function or the like is assigned to the extended detection area. Then, in the case of the portable information terminal of the present embodiment, in the window glass 51, the icons 53 are formed at positions corresponding to the extended detection area. Then, those icons 53 are prepared so as to cause the user to recognize that, by touching the position of any desired icon 53, the function button function corresponding to the icon 53 can be performed.

Here, the portable information terminal of the present embodiment is formed so as to cause the icons 53 to emit light individually or at a time, so that the light emission of the icons 53 enables icons to be more easily recognized visually.

Figure 15:
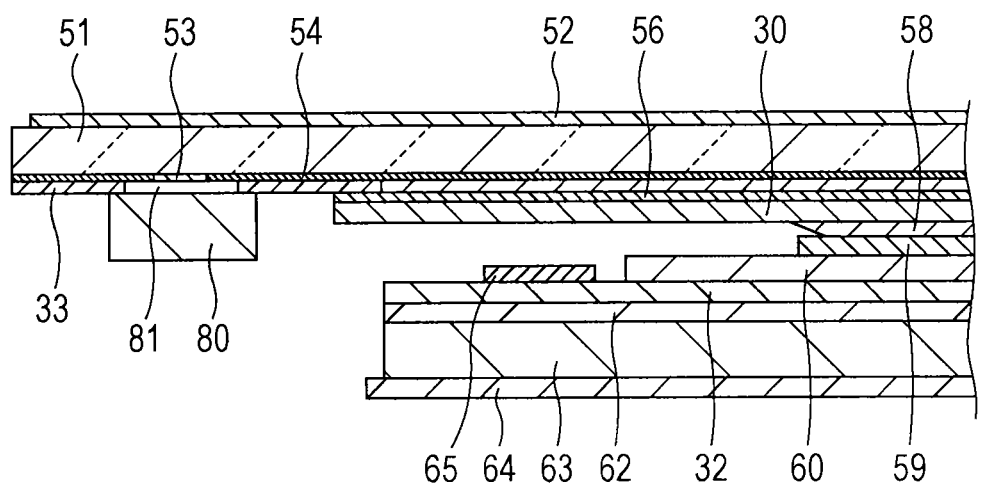
FIG. 15 is a schematic sectional view in which only portions in the vicinity of an icon, a conductive print pattern, and an illumination sheet part in the portable information terminal of the present embodiment, in which each icon can be made to illuminate, are enlarged.
Figure 16:
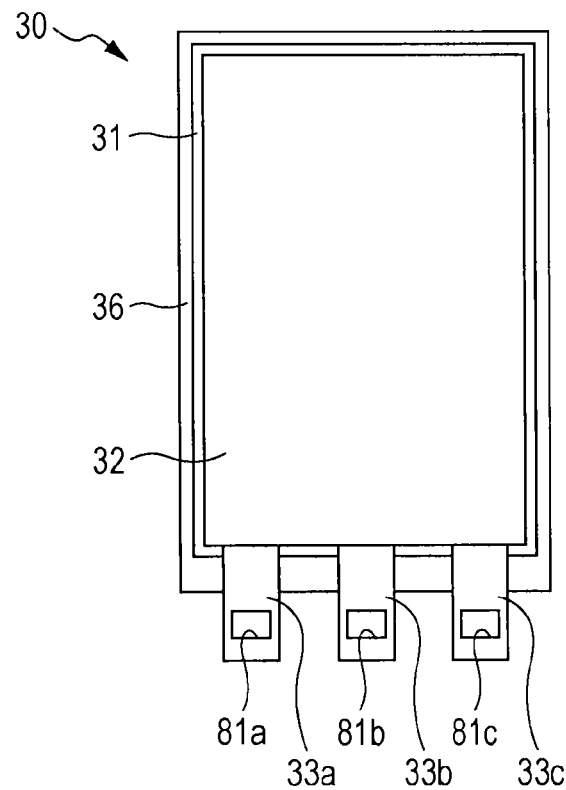
FIG. 16 illustrates a configuration example in which a window part for illumination is provided in a conductive print pattern that is capacitively coupled to an electrostatic capacitance type touch panel section in the portable information terminal of the present embodiment, in which each icon can be made to illuminate.
Figure 17:
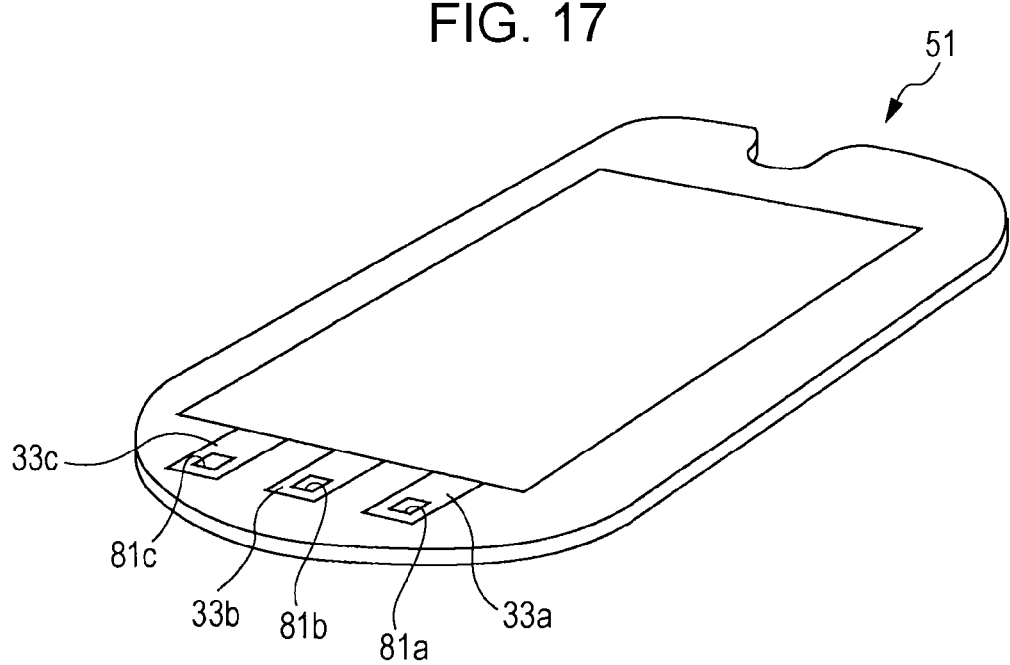
FIG. 17 is a perspective view when a window glass in an example in which a window part for illumination is provided in a conductive print pattern is viewed from the reverse surface side.

That is, the portable information terminal of the present embodiment includes, in order to realize the light emission of each of the icons 53, an illumination sheet part 80 that emits light by itself at a position corresponding to each of the icons 53 on the inner side of the housing of the window glass 51, as shown in, for example, FIGS. 15 and 16. Furthermore, in the case of this example, each of the icons 53 is formed as a result of, for example, the black screen 54 printed on the window glass 51 being clipped in accordance with the shape of each icon 53, in other words, as a result of a portion in which the black screen 54 is not printed being provided in accordance with the shape of each icon 53. In addition, in this example, the conductive print patterns 33a, 33b, and 33c that are provided in correspondence with each icon 53 has a cutout part (hereinafter referred to as window parts 81a, 81b, and 81c for illumination) for illuminating each icon 53 from inside the housing by using light that is emitted from the illumination sheet part 80, in other words, has a portion in which a conductive layer has not been printed. FIG. 17 illustrates an example in which the window parts 81a, 81b, and 81c for illumination are provided in the conductive print patterns 33a, 33b, and 33c, respectively, in the example in which the above-mentioned window glass 51 of the FIGS. 11 and 12 is viewed from the reverse surface side.

Figure 18:
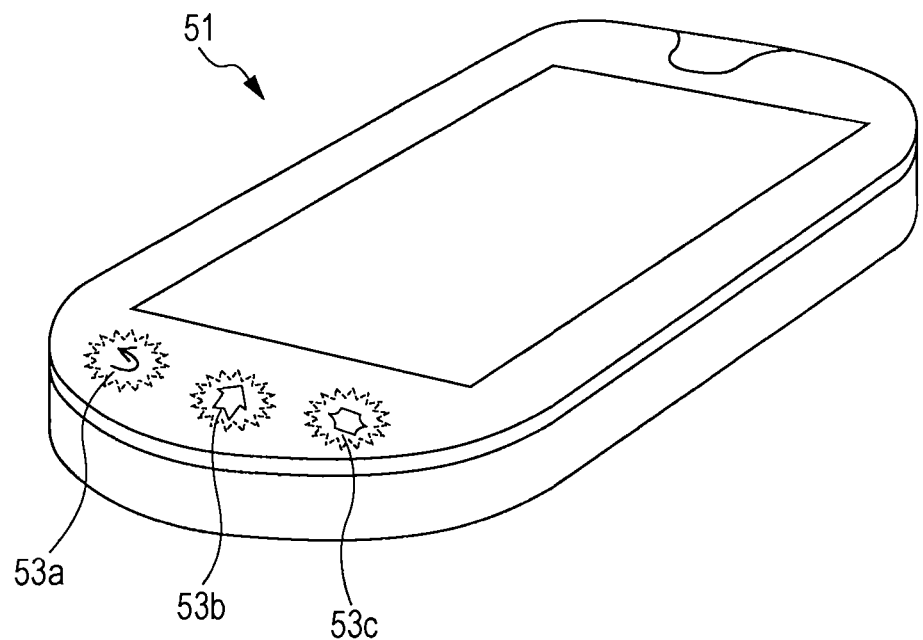
FIG. 18 is a schematic exterior perspective view of the portable information terminal of the present embodiment in a state in which each icon on the window glass is illuminated by light from the illumination sheet part inside the housing.

As a result, it becomes possible for the portable information terminal of the present embodiment to, as shown in FIG. 18, illuminate each of the icons 51a, 53b, and 53c on the window glass 51 which is on the housing front side by using light from the illumination sheet part 80 inside the housing individually or at a time.

In a case where the conductive print pattern is formed using, for example, a transparent conductive material or the like, the conductive print patterns 33a, 33b, and 33c may not necessarily include the window part for illumination.

[Another Example of Connection Between Square Transparent Electrode Unit and Conductive Print Pattern]

In the above-mentioned embodiment, a description has been given by using an example in which the predetermined square transparent electrode unit 40 and the conductive print pattern 33 of the touch panel section 30 are capacitively coupled to each other. Alternatively, the predetermined square transparent electrode unit 40 and the conductive print pattern 33 may be physically and electrically connected to each other (hereinafter this state will be referred to as a "joining").

For example, in the state of only the capacitive coupling in which joining has not been performed, in a case where there is a risk that the touch detection sensitivity of the extended detection area using the conductive print pattern 33 does not, for example, satisfy the sensitivity demanded regarding the design or the sensitivity becomes unstable, by joining the conductive print pattern 33 and the predetermined square transparent electrode unit 40, high touch detection sensitivity and high stability can be realized.

Furthermore, for example, in the state of only the capacitive coupling in which joining has not been performed, in a case where the conductive print pattern 33 is capacitively coupled to a plurality of square transparent electrode unit 40 because the area of the conductive print pattern 33 is relatively larger than the area of the square transparent electrode unit 40, the conductive print pattern 33 is joined to only one specific square transparent electrode unit 40. In this case, it is preferable that the joining between the specific square transparent electrode unit 40 and the conductive print pattern 33 be performed with a joining contact member such as that to be described later in between.

Figure 19:
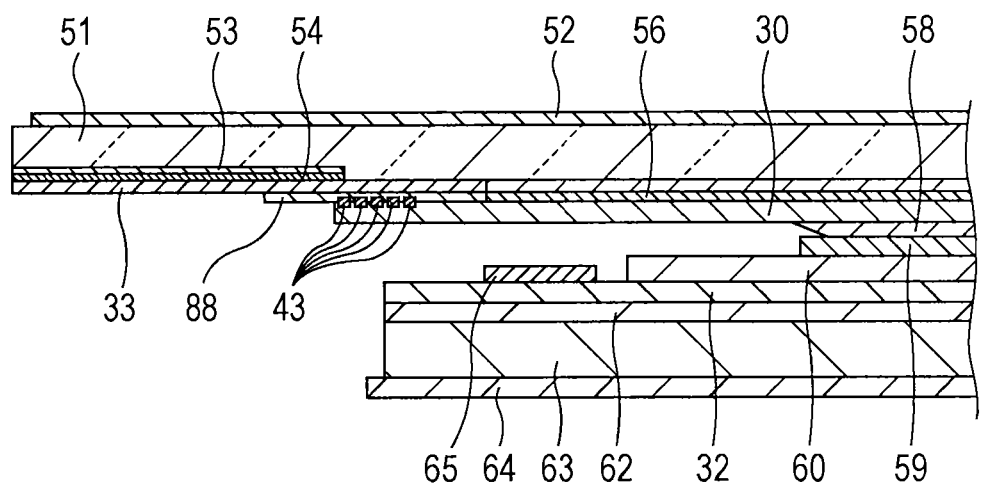
FIG. 19 is a schematic sectional view in which a portion in the vicinity of a conductive print pattern of the portable information terminal of the present embodiment in which a conductive print pattern arranged across an outer edge wiring pattern and a predetermined square transparent electrode unit are joined with a joining contact member in between is enlarged.

Furthermore, for example, in the state of only the capacitive coupling in which joining has not been performed, as shown in, for example, FIG. 19, the conductive print pattern 33 is arranged across the outer edge wiring pattern 43 of the touch panel section 30, the capacitive coupling is affected by electrical current that flows through the outer edge wiring pattern 43, and inconvenience, such as noise riding on the touch detection signal of the extended detection area or the touch detection sensitivity becoming unstable, occurs, it is preferable that the conductive print pattern 33 and the predetermined square transparent electrode unit 40 be joined with a joining contact member 88 (to be described later) in between. In FIG. 19, components attached with each designating numeral in the figure are similar to the components shown in FIG. 4 or the like, and thus, the descriptions thereof are omitted.

The joining contact member is formed of a sheet-like copper foil or a sheet-like conductive adhesive tape, as an example. The thickness of the joining contact member is determined by considering the thickness of the transparent laminate film 56 between the touch panel section 30 and the window glass 51. In the present embodiment, since the thickness of the transparent laminate film 56 is set at 0.05 mm to 0.1 mm, the thickness of the joining contact member is also set at 0.05 mm to 0.1 mm. Here, in a case where the joining contact member is the sheet-like copper foil, the sheet-like copper foil has a thickness equal to that of the transparent laminate film 56. When the window glass 51 on which the conductive print pattern 33 is formed is incorporated into the housing of the portable information terminal, the joining contact member is pasted using, for example, a conductive adhesive or a conductive adhesive tape at a position corresponding to the specific square transparent electrode unit on the conductive print pattern 33. Then, after that, when the window glass 51 is incorporated into the housing, the sheet-like copper foil is brought into a state in physical contact with the specific square transparent electrode unit or is pasted using a conductive adhesive tape or the like. As a result, the conductive print pattern 33 and the specific square transparent electrode unit are brought into a state that is in physical and electrical contact with each other with the sheet-like copper foil in between. Furthermore, in a case where the joining contact member is the sheet-like conductive adhesive tape, the sheet-like conductive adhesive tape has a thickness equal to that of the transparent laminate film 56. When the window glass 51 on which the conductive print pattern 33 is formed is incorporated into the housing of the portable information terminal, the sheet-like conductive adhesive tape is pasted on the conductive print pattern 33 and at a position corresponding to the specific square transparent electrode unit. Then, after that, when the window glass 51 is incorporated into the housing, the sheet-like conductive adhesive tape is pasted in a state in which the sheet-like conductive adhesive tape is in physical contact with the specific square transparent electrode unit. As a result, the conductive print pattern 33 and the specific square transparent electrode unit are brought into a state that is in physical and electrical contact with each other with the sheet-like conductive adhesive tape in between. Although the size and the shape of the joining contact member do not matter as long as the touch detection sensitivity of each extended detection area using the conductive print pattern 33 can be stably obtained sufficiently, the size thereof is preferably smaller than that of the conductive print pattern 33.

In a case where a window part for illumination such as that described above is provided in the conductive print pattern 33, it is preferable that the joining contact member be formed to be a shape that does not cover the illumination window part or be provided at a position at which the window part for illumination is not covered.

[Another Example of Conductive Layer According to an Embodiment]

In the above-mentioned embodiment, the conductive print pattern 33 has been used as an example of the conductive layer according to the embodiment. Alternatively, the conductive layer may be, for example, a sheet-like conductive member (hereinafter referred to as a conductive sheet). The conductive sheet, as a result of being capacitively coupled to the predetermined square transparent electrode unit as in the above-mentioned embodiment, forms an extended detection area similarly to the conductive print pattern 33.

For the conductive sheet, for example, a metal sheet formed of Ag or the like can be used. Furthermore, the thickness of the conductive sheet is determined by considering the thickness of the transparent laminate film 56 between the touch panel section 30 and the window glass 51 in a manner similar to that described above, and is set at 0.005 mm to 0.1 mm in the present embodiment.

In a case where the conductive sheet is formed as the extended detection area, concerning the formation process thereof, for example, in the third step shown in part (C) of FIG. 10 after undergoing the first and second steps shown in parts (A) and (B) of FIG. 10, the icons 53 or the like are printed on the inner plane of the housing of the window glass 51, and thereafter a conductive sheet with an adhesive sheet is pasted. Steps after that are the same as part (D) of FIG. 10 above and subsequent steps.

Furthermore, also, in a case where the extended detection area is to be formed using the conductive sheet, similarly to that described above, the predetermined square transparent electrode unit and the conductive sheet may be joined, or the predetermined square transparent electrode unit and the conductive sheet may be joined with a joining contact member in between.

That is, for example, by joining between the conductive sheet and the predetermined square transparent electrode unit, it is possible to realize high touch detection sensitivity and high stability in the extended detection area.

Furthermore, for example, even if, as a result of the conductive sheet being joined to only one specific square transparent electrode unit, for example, the area of the conductive sheet is a size that covers a plurality of square transparent electrode units, it is possible to join the conductive sheet to only specific square transparent electrode units among the plurality of square transparent electrode units. In this case, the joining between the specific square transparent electrode units and the conductive sheet is preferably performed with a joining contact member similar to that described above in between.

Furthermore, for example, even in a case where the conductive sheet is arranged across the outer edge wiring pattern 43 of the touch panel section 30 as a result of the conductive sheet and the predetermined square transparent conduction unit being joined with a joining contact member in between, stable touch detection can be performed with satisfactory sensitivity without being affected by electrical current flowing through the outer edge wiring pattern 43.

The conductive sheet may include a window part for illumination similar to that described above. Furthermore, in a case where a window part for illumination is to be provided in the conductive sheet, it is preferable that the joining contact member be formed into a shape that does not cover the illumination window part or be provided at a position at which the window part for illumination is not covered.

[Example of Determination as to Extended Detection Area Using Conductive Print Pattern and Detection Area Using Touch Panel Section]

In the portable information terminal of the present embodiment, as described above, the detection area of the touch panel section 30 can be extended using the conductive print pattern 33.

Figures 20, 21:
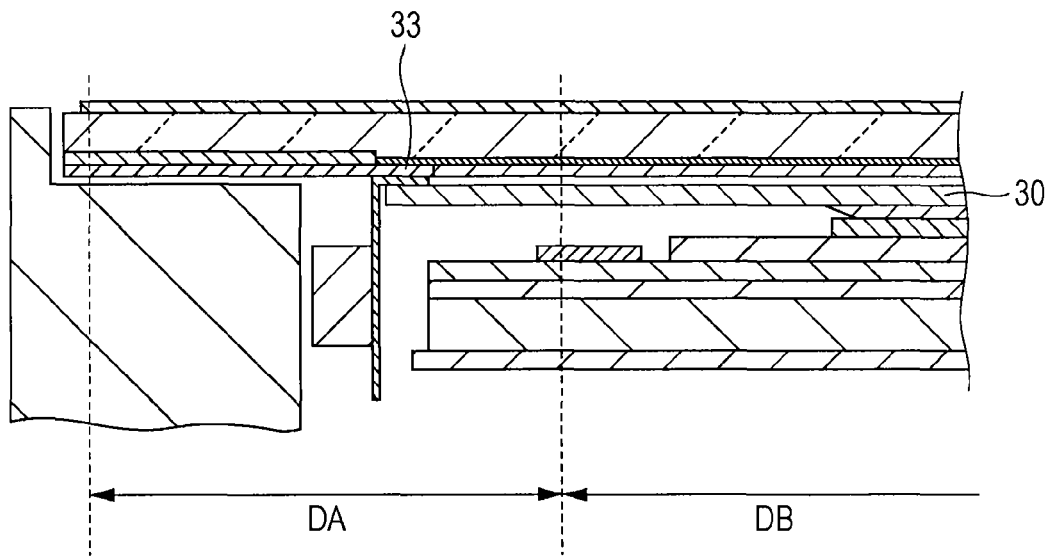
FIG. 20 is a view illustrating a detection area (touch panel detection area) using the touch panel section, and an extended detection area using a conductive print pattern.
FIG. 21 illustrates an example of a correspondence table used to determine which one of the touch panel detection area and the extended detection area has been touched when a touch using the external conductor, such as a finger, has been made in the portable information terminal of the present embodiment.

For this reason, in the portable information terminal of the present embodiment, as shown in FIG. 20, a touch using an external conductor, such as a finger of a user, can be detected by distinguishing between the detection area (hereinafter referred to as a touch-panel detection area DB) using the touch panel section 30 and the extended detection area DA using the conductive print pattern 33.

FIG. 21 illustrates an example of a correspondence table used when a touch of an external conductor is detected by making a distinction between the touch panel detection area DB and the extended detection area DA.

That is, as shown in FIG. 21, when, for example, approach of an external conductor, such as a finger of a user, is detected only in the extended detection area DA using the conductive print pattern 33, the portable information terminal of the present embodiment determines that only a touch on the extended detection area DA has been made. Furthermore, in a case where, for example, approach of an external conductor, such as a finger of a user, is detected only in the detection area DB of the X-Y transparent electrode pattern part 31 of the touch panel section 30, the portable information terminal of the present embodiment determines that only a touch on the touch panel detection area DB has been made.

In contrast, for example, when approach of an external conductor, such as a finger of a user, is near the boundary between the touch panel detection area DB and the extended detection area DA, and is moved between the touch panel detection area DB and the extended detection area DA, the portable information terminal of the present embodiment determines that an area when the external conductor, such as the finger of the user, has been moved away has been touched.

That is, in a case where, for example, a touch on the extended detection area DA is detected earlier, the touch position is moved to the touch panel detection area DB while the touch state is maintained, thereafter the external conductor, such as a finger, is made apart, and the touch is released, the portable information terminal of the present embodiment determines that only the touch at the touch position immediately before the touch is released, that is, only the touch in the touch panel detection area DB, is effective, and that the touch in the extended detection area DA is ineffective.

Similarly, for example, in a case where a touch in the touch panel detection area DB is detected earlier, the touch position is moved to the extended detection area DA while the touch state is maintained, thereafter an external conductor, such as a finger, is made apart, and the touch is released, the portable information terminal of the present embodiment determines that only the touch at the touch position immediately before the touch is released, that is, only the touch in the extended detection area DA, is effective, and that the touch in the touch panel detection area DB is ineffective.

[Example of Assignment of Function Button Functions to Extended Detection Area]

As described above, the portable information terminal of the present embodiment is formed so as to be able to assign, for example, a function button function to an extended detection area using the conductive print pattern 33. Furthermore, the portable information terminal of the present embodiment is formed so as to be able to switch and change the functions that are assigned to the function buttons for each application program that is being executed. In addition, the portable information terminal of the present embodiment includes, for example, a gravity detection sensor, so that, on the basis of the output of the gravity detection sensor, a case in which the portable information terminal is used in a state in which the user holds the terminal in, for example, a horizontal direction (long-length direction is nearly horizontal), and a case in which the portable information terminal is used in a state in which the user holds the terminal in, for example, a vertical direction (short-length direction is nearly horizontal) can be detected. Then, the portable information terminal of the present embodiment is formed so as to be able to change as appropriate the function of the function button that is assigned for each application program that is being executed in accordance with the horizontal/vertical direction detection result.

FIGS. 22 and 23 illustrate an example of function button functions that are assigned in accordance with each application program that is being executed to each extended detection area using three (a total of 12) conductive print patterns 33 of each side, which are provided in each of four sides of the window glass 51 as in, for example, FIG. 14.

In FIGS. 22 and 23 and in the following description, the twelve conductive print patterns 33 will be referred to as conductive print patterns E1 to E12, respectively. Furthermore, in this example, as examples of the application program, a camera application program, a moving image reproduction application program, a mail display application program, and a character input application program are given.

Of course, these application programs are examples. It is possible for the portable information terminal of the present embodiment to assign various function button functions to the extended detection area in accordance with the execution of other various types of application programs, and further assign another function other than the function button function to each extended detection area.

[Example of Assignment of Function Button Functions when Camera Application Program is Executed During Reproduction Mode]

In these examples of FIGS. 22 and 23, in a case where the application program that is being executed is a camera application program and the operation mode when the camera application program is executed is, for example, a reproduction mode in which a stored image is displayed on a display screen, as an example, the portable information terminal of the present embodiment assigns several function button functions having a high use frequency in the reproduction mode to the conductive print patterns E1, E2, and E3, and E4, E5, and E6, which are arranged in the short-length direction of the housing among the conductive print patterns E1 to E12.

That is, in the case of the present embodiment, as an example, the portable information terminal assigns, for example, a reproduction display image switching function to the conductive print patterns E1, E2, and E3 and assigns, for example, a reproduction image expansion/reduction zoom function to the conductive print patterns E4, E5, and E6. As a result, for example, in a case where a touch by the user is detected in the extended detection area using the conductive print patterns E1, E2, and E3, the portable information terminal of the present embodiment switches the image to be displayed on the display screen in accordance with the touch detection position.

Furthermore, for example, in a case where a touch by the user is detected in the extended detection area using the conductive print patterns E4, E5, and E6, the portable information terminal of the present embodiment causes an image expansion or reduction zoom display displayed on the display screen to be performed in accordance with the slide detection direction and the slide detection amount at the touch detection position or when a slide is made in the touched state.

The reason why a function button function is assigned to each of the conductive print patterns E1, E2, and E3, and E4, E5, and E6 during the reproduction mode of the camera application program is as follows. When an image is to be displayed on the display screen of the portable information terminal, the user is highly probable to use the portable information terminal in a state in which the portable information terminal is held with a hand with the long-length direction of the display of the camera being nearly horizontal. In that case, it is considered that the user is easy to operate the portable information terminal with a finger of the hand.

Of course, in a case where the portable information terminal of the present embodiment determines on the basis of the horizontal/vertical direction detection result that the user is using the portable information terminal while holding it with a hand in a state in which the short-length direction of the display of the camera being nearly horizontal, the portable information terminal may switch the assignment so that a function button function similar to that described above is assigned to the conductive print patterns E7, E8, and E9, and E10, E11, and E12 in the long-length direction of the housing.

[Example of Assignment of Function Button Functions when Camera Application Program is Executed During Image-Capturing Mode]

Furthermore, for example, in a case where the application program that is being executed is a camera application program, and the operation mode when the camera application program is being executed is, for example, an image-capturing mode in which image capturing is possible, as an example, the portable information terminal of the present embodiment assigns several function button functions having a high use frequency during the image-capturing mode to the conductive print pattern E12 that is in the long-length direction of the housing and that is arranged at an upper side position with respect to the gravity direction and to, for example, the conductive print patterns E4, E5, and E6 that are arranged in the short-length direction of the housing among the conductive print patterns E1 to E12.

That is, in the case of the present embodiment, as an example, the portable information terminal assigns, for example, an image-capturing shutter button function to the conductive print pattern E12, and assigns, for example, an image-capturing angle of view zoom-in/zoom-out function to the conductive print patterns E4, E5, and E6. As a result, for example, in a case where a touch by the user is detected in the extended detection area corresponding to the conductive print pattern E12, the portable information terminal of the present embodiment performs image capturing at the time of the touch detection.

Furthermore, for example, in a case where a touch by the user is detected in the extended detection area using the conductive print patterns E4, E5, and E6, and the touch position is moved, the portable information terminal of the present embodiment performs image-capturing angle of view zoom-in or zoom-out in accordance with the touch position, and the direction and the distance of the movement.

The reason why a shutter button function is assigned to the conductive print pattern E12 in the long-length direction of the housing and at an upper side position with respect to the gravity direction in the image-capturing mode of the camera application program is that in a case where the portable information terminal is used as a camera, the user is considered to be highly probable to use the portable information terminal while holding it with a hand with the long-length direction of the display of the camera being nearly horizontal. That is, in a case where the portable information terminal is used as a camera while holding it with a hand in a horizontal position state, the user can operate the shutter button with, for example, the thumb of the right hand, and can perform a zoom operation also with, for example, the thumb of the right hand with regard to zoom in/zoom out of the image-capturing angle of view.

Of course, in a case where the portable information terminal of the present embodiment determines on the basis of the horizontal/vertical direction detection result that the user is to perform so-called vertical position image capturing, the portable information terminal of the present embodiment may switch the assignment so that a shutter button function is assigned similarly to that described above to a conductive print pattern that is on the upper side with respect to the gravity direction and that is arranged at the right end in the short-length direction of the housing, and further, a zoom in/zoom out function is assigned to each conductive print pattern arranged in the long-length direction of the housing similarly to that described above. That is, in the case of this example, in a case where the conductive print patterns E1, E2, and E3 become on the upper side with respect to the gravity direction, as an example, the portable information terminal of the present embodiment assigns an image-capturing shutter button function to the conductive print pattern E3 and assigns a zoom in/zoom out function to the conductive print patterns E6, E7, and E8.

In addition, as another example, in a case where, for example, the conductive print pattern E12 in the long-length direction of the housing and at an upper side position with respect to the gravity direction is formed as having extended up to the housing side surface similarly to the example of FIG. 13, it becomes possible for the user to perform an operation of pressing the shutter button that is assigned to the conductive print pattern E12 with the index finger of the right hand.

[Example of Assignment of Function Button Functions when Moving Image Reproduction Application Program is Executed]

Furthermore, for example, in a case where the application program that is being executed is a moving image reproduction application program, the portable information terminal of the present embodiment assigns several function button functions having a high use frequency when the moving image reproduction is reproduced to, for example, the conductive print patterns E7, E8, and E9 that are arranged in the short-length direction of the housing and at a lower side position with respect to the gravity direction among the conductive print patterns E1 to E12.

That is, in the case of the present embodiment, as an example, the portable information terminal assigns, for example, a slider function for specifying a reproduction position with respect to the total reproduction time period of a moving image that is being reproduced to the conductive print patterns E7, E8, and E9. As a result, in a case where, for example, a touch by the user is detected in the extended detection area using the conductive print patterns E7, E8, and E9, the portable information terminal of the present embodiment obtains the reproduction position with respect to the total reproduction time period of the moving image that is being reproduced at a percentage corresponding to the touch detection position, and causes the moving image to be reproduced from the reproduction position.

The reason why function button functions are assigned to the conductive print patterns E7, E8, and E9 in the short-length direction of the housing and on the lower side with respect to the gravity direction when the moving image reproduction application program is executed is that in a case where the moving image displayed on the display screen of the portable information terminal is being viewed by the user, the display is prevented from being shielded by the hand of the user, or the like.

Of course, in a case where the portable information terminal of the present embodiment determines on the basis of the horizontal/vertical direction detection result that the user is viewing a moving image while holding the portable information terminal with a hand with the short-length direction of the display of the camera being nearly horizontal, the portable information terminal of the present embodiment may switch the assignment in such a way that a function button function is assigned to each conductive print pattern that is in the long-length direction of the housing and on the lower side with respect to the gravity direction.

[Example of Assignment of Function Button Functions when Mail Display Application Program is Executed]

Furthermore, for example, in a case where the application program that is being executed is a mail display application program, the portable information terminal of the present embodiment assigns several function button functions having a high use frequency at the time of the mail application program to, for example, the conductive print patterns E7, E8, and E9, and E10, E11, and E12 in the long-length direction of the housing from among the conductive print patterns E1 to E12.

That is, in the case of the present embodiment, as an example, the portable information terminal assigns a scroll function for advancing the mail display screen to the conductive print patterns E7, E8, and E9, or E10, E11, and E12. As a result, in a case where, for example, a scroll operation by the user is detected in the extended detection area using the conductive print patterns E7, E8, and E9 or E10, E11, and E12, the portable information terminal of the present embodiment performs screen advance and display in accordance with the scroll direction and the scroll amount.

The reason why a function button function is assigned to the conductive print patterns E7, E8, and E9 or E10, E11, and E12 in the long-length direction of the housing when the mail display application program is executed is that in a case where the user is viewing a mail text, a mail list, or the like, which is displayed on the display screen of the portable information terminal, the user is highly probable to use the portable information terminal while holding it with a hand with the short-length direction of the portable information terminal being nearly horizontal. In that case, it is considered that it is easy for the user to perform a scroll operation with a finger of the hand.

Of course, in a case where the portable information terminal of the present embodiment determines on the basis of the horizontal/vertical direction detection result that the user is using the portable information terminal while holding it with a hand with the long-length direction of the display being nearly horizontal, the portable information terminal may switch the assignment in such a manner that a function button function is assigned to the conductive print patterns E1, E2, and E3 or E4, E5, and E6 in the short-length direction of the housing.

[Example of Assignment of Function Button Functions when Character Input Application Program is Executed]

Furthermore, for example, in a case where the application program that is being executed is a character input application program, the portable information terminal of the present embodiment assigns several function button functions having a high use frequency to, for example, the conductive print patterns E1, E2, and E3, and E4, E5, and E6 in the short-length direction of the housing from among the conductive print patterns E1 to E12 at the time of the character input application program.

That is, in the case of the present embodiment, as an example, the portable information terminal assigns a function for specifying a character and deciding the specified character to the conductive print patterns E1, E2, and E3, and E4, E5, and E6.

In this case, when the character input application program is started up, the portable information terminal of the present embodiment develops, onto a memory or the like, information (a table as an example) in which, for example, each alphabet character is associated with a combination of, for example, a touch position in the extended detection area using the conductive print patterns E1, E2, and E3 and a touch position in the extended detection area using the conductive print patterns E4, E5, and E6.

Furthermore, when a desired touch position in the extended detection area using the conductive print patterns E1, E2, and E3 and a desired touch position in the extended detection area using the conductive print patterns E4, E5, and E6 are specified by the user during the character input mode using the character input application program, the portable information terminal of the present embodiment displays a character that is referred to from the table or the like with respect to the combination of both the touch positions as a specification character before being decided, for example, at the cursor position on the display screen.

Furthermore, in a case where the touch state of one of both the extended detection areas is maintained, when the touch position is made to slide and move by the user, the portable information terminal of the present embodiment switches the specification character in accordance with the change in the combination of both the touch positions due to the slide movement, and displays the specification character at the cursor position or the like on the display screen.

Furthermore, in a case where only one of both the extended detection areas is maintained and the other touch state is released, the portable information terminal of the present embodiment fixes the touch position when the touch state is released. On the other hand, when the touch position at which the touch state is maintained is changed, the portable information terminal of the present embodiment displays, as the specification character, the character that is referred to from the table or the like on the basis of the combination of the fixed touch position and the changed touch position at the cursor position or the like on the display screen.

Then, when the touch is released with regard to both the extended detection areas in a state in which the character desired by the user is specified in accordance with the combination of both the touch positions as described above in the character input mode, the portable information terminal of the present embodiment displays the specified character as a decided character on the display screen. In a case where the character is decided, the portable information terminal of the present embodiment moves the cursor position on the display screen to the next character input position, and enters a state of waiting for the next character to be input.

The reason why a character specification and decision function is assigned to the conductive print patterns E1, E2, and E3, and E4, E5, and E6 in the short-length direction of the housing when the character input application program is executed is that, for example, the character input screen in a case where alphabet characters or the like are input is considered to be highly probable to be used as a landscape screen.

Of course, in a case where the portable information terminal of the present embodiment determines on the basis of the horizontal/vertical direction detection result that the portable information terminal is used on a portrait screen in which the short-length direction of the display is nearly horizontal, the portable information terminal of the present embodiment may switch the assignment in such a manner that the character specification and decision function is assigned to the conductive print patterns E7, E8, and E9, and E10, E11, and E12 in the long-length direction of the housing.

In addition, a character input by executing the character input application program can be applied to not only the above-described case in which alphabet characters are input, but also to, for example, character input of specifying one character by selecting a vowel and a consonant in input of a Japanese character.

In the case of a character specification example by selecting a vowel and a consonant, as an example, the portable information terminal of the present embodiment selects a vowel in accordance with the touch position in the extended detection area using the conductive print patterns E1, E2, and E3, selects a consonant in accordance with the touch position in the extended detection area using the conductive print patterns E4, E5, and E6, decides and displays, as a specification character before being decided, a character that is referred to from the table or the like on the basis of the combination of the vowel and the consonant at, for example, the cursor position on the display screen.

Of course, also in this example, similarly to that described above, in a case where the portable information terminal of the present embodiment determines on the basis of the horizontal/vertical direction detection result that the terminal is being used on a portrait screen with the short-length direction of the display been nearly horizontal, the portable information terminal of the present embodiment may switch the assignment so that the character specification and character decision functions by the selecting a vowel and a consonant are assigned to the conductive print patterns E7, E8, and E9, and E10, E11, and E12 in the long-length direction of the housing.

[Schematic Block Configuration of Portable Information Terminal Including Touch Panel Section of Present Embodiment]

Figure 24:
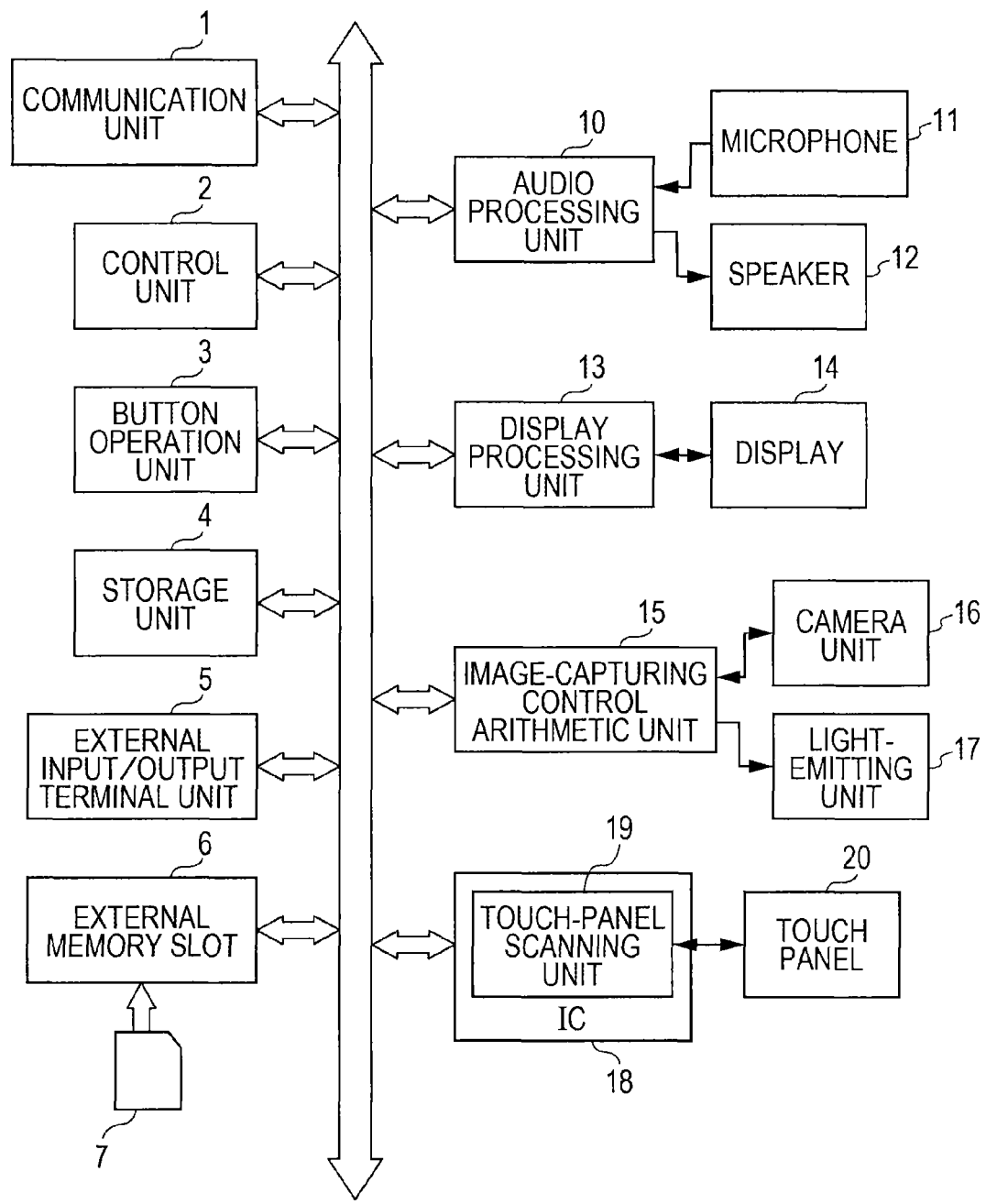
FIG. 24 is a block diagram illustrating a schematic internal configuration of a portable information terminal of the present embodiment including a touch panel section to which a conductive print pattern is capacitively coupled.

FIG. 24 illustrates an example of a schematic internal block configuration of a portable information terminal including the touch panel section 30 of the present embodiment. The portable information terminal of the present embodiment can be applied, as an example, to various terminals, such as, for example, a highly functional portable telephone terminal, a tablet terminal, and a digital camera terminal, all of which including a touch panel section.

In FIG. 24, a communication unit 1 includes a communication unit for performing communication through a communication antenna, a portable telephone network, or a public wireless communication network.

A button operation unit 3 is constituted by hard keys that are provided on a housing of the portable information terminal of the present embodiment, and a peripheral circuit thereof.

A speaker 12 is used for, for example, music reproduction, output of received telephone conversation, output of received call sound, and the like. A microphone 11 is used for collecting external sound, collecting transmitted telephone conversation, and the like. An audio processing unit 19 is a circuit for processing an audio signal that is input and output by the speaker 12 and the microphone 11.

A display 14 is a display panel formed of, for example, a liquid-crystal panel or an organic EL panel. A display processing unit 13 includes an image signal processing circuit for generating an image signal that is displayed on the display 14, and a driving circuit for driving the display of the display 14 on the basis of the image signal. In the portable information terminal of the present embodiment, on the display 14, a display image, such as a mail display screen, a Web screen, and a character input screen, a still image, a moving image, or the like, is displayed.

An external input/output terminal unit 5 is constituted by a cable connection connector used, for example, when data communication is performed through a cable, an interface circuit for external data communication, a charging terminal used when an internal battery is charged through a power supply cable or the like, and a charging interface circuit thereof. The portable information terminal of the present embodiment is formed so as to be able to obtain, from an external device connected to the external input/output terminal unit 5, an application program including an operation control program according to the present embodiment, other various programs, and data.

An external memory slot 6 is constituted by a memory removable unit to which an external memory 7 formed from a semiconductor storage medium is loaded/unloaded, an interface circuit for transmitting and receiving data, programs, and the like to and from an external memory loaded into the memory removable unit, and the like. The external memory 7 may be a recording medium having recorded thereon an application program including an operation control program according to the embodiment. In this case, it is possible for the portable information terminal according to the embodiment to obtain those application programs and the like from the external memory 7.

A camera unit 16 includes an image-capturing element for capturing a still image and a moving image, an optical system for forming a subject image on the image-capturing element, an auto-focus mechanism for driving the lenses of the optical system so as to perform automatic focusing, an auto-iris mechanism for driving the aperture of the optical system so as to perform automatic aperture adjustment, a shutter speed adjustment mechanism for adjusting the shutter speed by mechanical or electronic type, a camera-shake correction mechanism for correcting for so-called camera shake, and a driving circuit for driving those mechanisms.

A light-emitting unit 17 includes a light unit made from an LED for emitting light, such as image-capturing illumination light (for example, strobe light) for illuminating a subject when performing image capturing using the camera unit 16 or image-capturing auxiliary light for obtaining brightness at which auto focus is normally operated, and a light-emission driving circuit for driving the light emission of the light unit.

The image-capturing control arithmetic unit 15, under the control of the control unit 2, causes an image-capturing operation in the camera unit 16, an automatic focusing operation of the auto-focus mechanism, the automatic aperture adjustment operation of the auto iris mechanism, the shutter speed adjustment operation of the shutter speed adjustment mechanism, the camera-shake correction operation of the camera shake correction mechanism or the like to be performed. Furthermore, the image-capturing control arithmetic unit 15 controls the light-emission driving circuit of the light-emitting unit 17 so as to cause the light-emitting unit 17 to perform a light emission operation of the image capturing illumination light and a light emission operation of image-capturing auxiliary light.

A touch panel 20 includes the above-mentioned touch panel section 30, a predetermined square transparent electrode unit 40X in the outer edge portion of the touch panel section 30, the conductive print pattern 33 that is capacitively coupled to a square transparent electrode unit 40Y, and the like.

An IC 18 corresponds to the IC 35 for the above-mentioned touch panel section 30, and is configured to include the touch-panel scan unit 19. The touch-panel scan unit 19 scans each square transparent electrode unit 40X and each square transparent electrode unit 40Y of the X-Y transparent electrode pattern part 31 of the touch panel section 30 so as to detect a change in the electrostatic capacitance in the X direction and in the Y direction, and also obtains a coordinate value of the square transparent electrode unit in which the electrostatic capacitance has changed. The information on the coordinate value obtained by the IC 18 and the changed electrostatic capacitance value is sent to the control unit 2.

A storage unit 4 is formed from a built-in memory provided inside the portable information terminal, and a removable card-shaped memory. Examples of removable card-shaped memories include a card for storing so-called SIM (Subscriber Identity Module) information and the like. The built-in memory is formed from a ROM and a RAM. The ROM is formed as a rewritable ROM. The ROM has stored thereon an OS (Operating System), control programs by which the control unit 2 controls the entire portable information terminal and each unit, various application programs including an operation control program corresponding to the output of the touch panel section 30 of the present embodiment, additionally various initial set values, various data, and the like. The RAM works as a work area and a buffer area when the control unit 2, the image-capturing control arithmetic unit 15 and the like perform various data processing, and stores data as desired.

The control unit 2 is formed of a main CPU (central processing unit), controls each unit, such as the communication unit 1, the display control unit 13, the audio processing unit 10, the external input/output terminal unit 5, the external memory slot 6, the image-capturing control arithmetic unit 15, the IC 18, and the like, and further performs various arithmetic operations as necessary. The control unit 2 executes various programs and the like that are stored in the storage unit 4. The execution of the operation control program and the application program based on the output of the touch panel section 30 of the present embodiment is performed by the control unit 2.

Although the illustration is omitted in FIG. 24, of course, the portable terminal of the present embodiment includes components that are provided in a typical portable information terminal, such as a clock unit for measuring a time period and time, a battery for supping electric power to each unit, a power management IC for controlling the electric power, a digital broadcast receiving module for receiving a digital television broadcast and a digital radio broadcast, for example, a non-contact communication module for performing non-contact communication, which is used in so-called RFID (Radio Frequency-Identification: radio wave method recognition), a non-contact type IC card or the like, a GPS module for obtaining the latitude and the longitude of the present position of the portable terminal by using a GPS signal from a GPS (Global Positioning System) geodetic satellite, a short-distance wireless communication unit for a wireless LAN and Bluetooth (registered trademark), for example, various sensor units, such as a gravity sensor, an inclination sensor, an acceleration sensor, a direction sensor, a temperature sensor, a humidity sensor, and an illumination sensor.

[Flowchart of Application Program and Operation Control Program of Present Embodiment]

With reference to FIGS. 25 to 28, a description will be given of the flow of processing when the control unit 2 of the portable information terminal of the present embodiment executes an operation control program based on the output of the touch panel section 30 while executing an application program desired by a user.

In the following description, examples of application programs desired by the user include the moving image reproduction application program, the camera application program, and the character input application program, which are described above. Of course, those application programs are examples, and the portable information terminal according to the embodiment can execute an operation control program based on the output of the touch panel section 30 also when an application program other than those is executed.

Furthermore, the operation control program based on the output of the touch panel section 30 of the present embodiment may be separately prepared as an independent program, or may be formed as a program contained in each application program. In a case where the operation control program is separately prepared as an independent program, the operation control program is formed as a program that operates in cooperation with each other in response to a request from the application program that is being executed.

[Example of Flowchart when Moving Image Reproduction Application Program is Executed]

Figure 25:
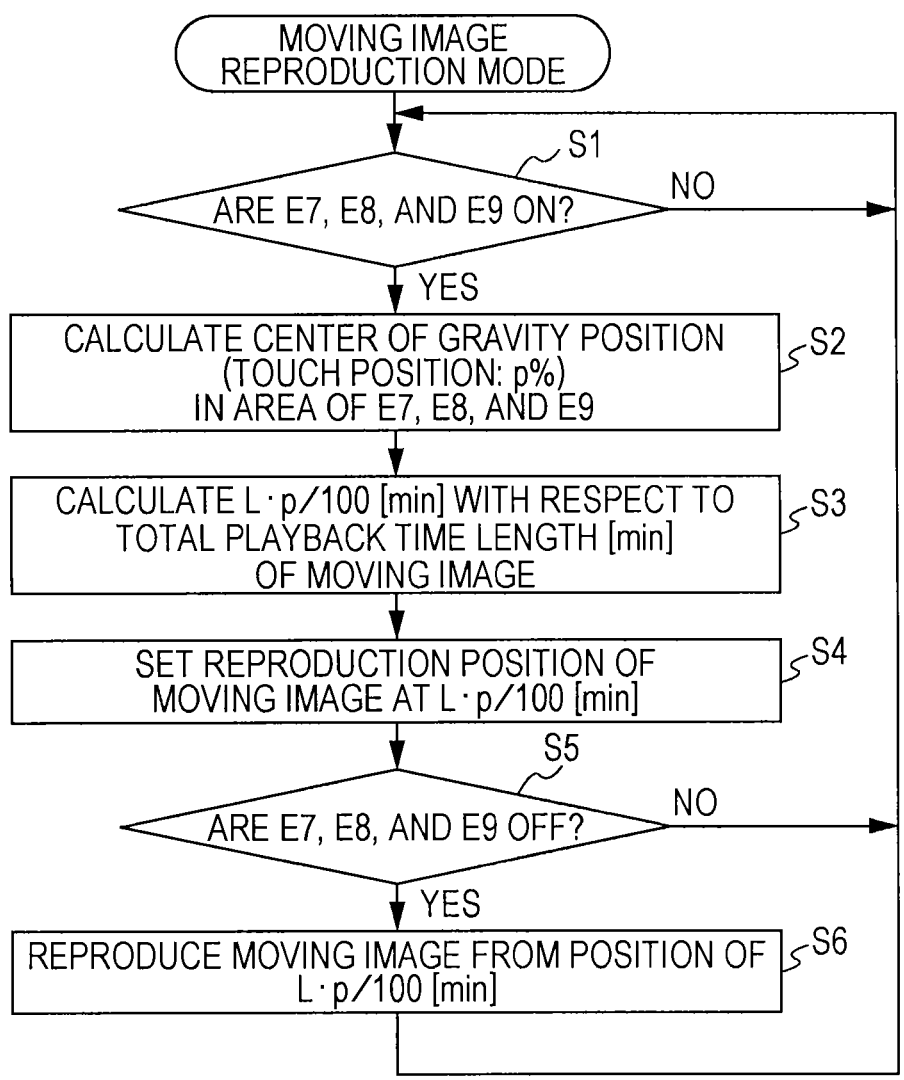
FIG. 25 is a flowchart illustrating the flow of processing when a moving image reproduction application program and an operation control program of the present embodiment are executed.

FIG. 25 illustrates the flow of processing when the moving image reproduction application program and the operation control program are executed.

The example of FIG. 25 shows a processing example in a case where twelve conductive print patterns E1 to E12 shown in FIG. 22 are capacitively coupled to the touch panel section 30, and as shown in FIG. 23, a slider function for specifying a reproduction position with respect to the total reproduction time period of a moving image is assigned to the extended detection area using the conductive print patterns E7, E8, and E9.

In the flowchart of FIG. 25, when the moving image reproduction application program is executed and moving image data desired by the user is being reproduced, the control unit 2, as a process of step S1, monitors whether or not a touch by the user has been detected in the extended detection area using the conductive print patterns E7, E8, and E9.

Here, the touch-panel scan unit 19 is scanning whether or not a change in the electrostatic capacitance of all the square transparent electrode units 40X and 40Y of the X-Y transparent electrode pattern part 31 has exceeded a predetermined threshold value TH, and is performing scanning of outputting the coordinate value of each of the square transparent electrode units 40X and 40Y in which the predetermined threshold value TH is exceeded and the electrostatic capacitance detection value thereof.

For this reason, for example, in a case where any position in the extended detection area using the conductive print patterns E7, E8, and E9 is touched by the user, the touch-panel scan unit 19 detects a change in the electrostatic capacitance from only the predetermined square transparent electrode units that are capacitively coupled to the conductive print patterns E7, E8, and E9 from among all the square transparent electrode units 40X and 40Y of the X-Y transparent electrode pattern part 31, and also outputs the electrostatic capacitance detection values, and the coordinate values of those predetermined square transparent electrode units to the control unit 2.

Therefore, when the coordinate values of the predetermined square transparent electrode units that are capacitively coupled to the conductive print patterns E7, E8, and E9, and the electrostatic capacitance detection values are supplied from the touch-panel scan unit 19, it is possible for the control unit 2 to determine that a touch by the user has been detected in the extended detection area.

Then, in a case where a touch by the user is detected in the extended detection area using the conductive print patterns E7, E8, and E9, the control unit 2 causes the process to proceed to step S2.

When the process proceeds to step S2, on the basis of the output of the touch-panel scan unit 19, the control unit 2 calculates which position in the extended detection area using the conductive print patterns E7, E8, and E9 the user has touched.

That is, in step S2, the control unit 2 determines which position TP in the extended detection area has been touched by the user on the basis of a center of gravity position calculation based on the coordinate values and the electrostatic capacitance detection values of the square transparent electrode units that are capacitively coupled to the conductive print pattern E7, the coordinate values and the electrostatic capacitance detection values of the square transparent electrode units that are capacitively coupled to the conductive print pattern E8, and the coordinate values and the electrostatic capacitance detection values of the square transparent electrode units that are capacitively coupled to the conductive print pattern E9.

Figure 26:
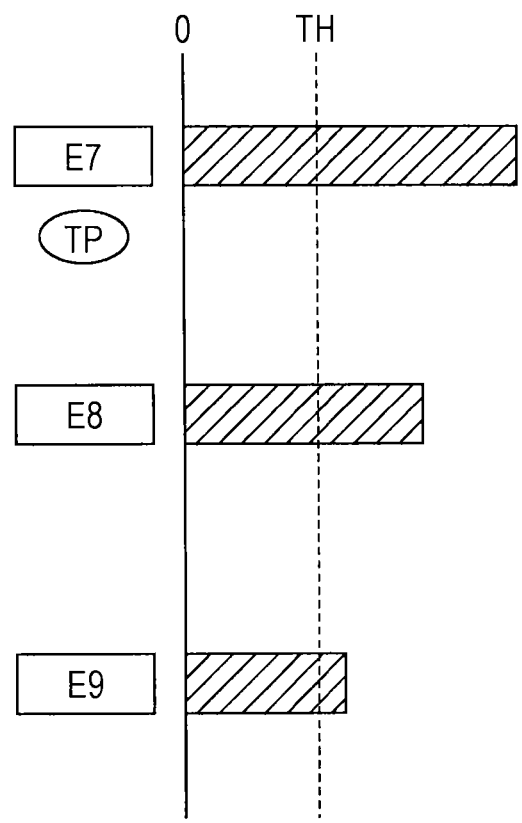
FIG. 26 is a view illustrating a center of gravity position calculation, which is based on each coordinate value of each conductive print pattern and an electrostatic capacitance detection value in a case where a user has touched in an extended detection area using three conductive print patterns.

For example, as shown in FIG. 26, in a case where the electrostatic capacitance detection values of the square transparent electrode units that are capacitively coupled to the conductive print pattern E7 have the largest values, the electrostatic capacitance detection values of the square transparent electrode units that are capacitively coupled to the conductive print pattern E9 have the next large value, and the electrostatic capacitance detection values of the square transparent electrode units that are capacitively coupled to the conductive print pattern E9 has a small value, the center of gravity position becomes a position TP close to the conductive print pattern E7. Therefore, it is possible for the control unit 2 to recognize that the position TP close to the conductive print pattern E7 is a position at which the user has touched.

In addition, the control unit 2 calculates the percentage (p %) of the touch position of the user in the extended detection area with respect to the width in the arrangement direction of the conductive print patterns E7, E8, and E9 in the extended detection area. When the percentage calculation is completed, the control unit 2 causes the process to proceed to step S3.

When the process proceeds to step S3, the control unit 2 calculates a time period that becomes L·p/100 [min] with respect to the total reproduction time length L [min] of the moving image that is being reproduced in accordance with the moving image reproduction application program.

Then, in the process of step S4, the control unit 2 sets the time period of the L·p/100 [min] obtained in step S3 at the reproduction position of the moving image. That is, the control unit 2 sets the reproduction position of the moving image to a position that is advanced by an amount corresponding to the percentage (p %) of the touch position with respect to the width in the arrangement direction of the conductive print patterns E7, E8, and E9 with respect to the total reproduction time length L [min] of the moving image.

When the calculation in step S4 is completed, in the process of step S5, the control unit 2 determines whether or not the touch by the user has been released in the extended detection area using the conductive print patterns E7, E8, and E9. In a case where the touch has not been released, the control unit 2 causes the process to return to step S1, and when the touch has been released, the control unit 2 causes the process to proceed to step S6.

When the process proceeds to step S6, the control unit 2 causes a moving image to be reproduced from the reproduction position that is set in step S4. After step S6, the control unit 2 causes the process to return to step S1.

According to the processing example of the flowchart of FIG. 25, in a case where a moving image is being reproduced, the portable information terminal of the present embodiment can realize reproduction control of causing the reproduction position of the moving image to jump in accordance with the touch position when a touch by the user has been performed at any position in the extended detection area using the conductive print patterns E7, E8, and E9. For this reason, it is possible for the user using the portable information terminal of the present embodiment to quickly and easily specify the reproduction position of the moving image.

Furthermore, according to the processing example of the flowchart of FIG. 25, on the display screen of the portable information terminal, for example, a slider bar icon or the like for showing the reproduction position of a moving image does not need to be displayed. Thus, the display on the display screen is not obstructed by the slider bar icon or the like, and effective use of the display screen is possible.

As described above, the portable information terminal of the present embodiment makes it possible to realize an operation system that is easy to use for the user.

[Example of Flowchart when Camera Application Program (Image-Capturing Mode) is Executed]

Figure 27:
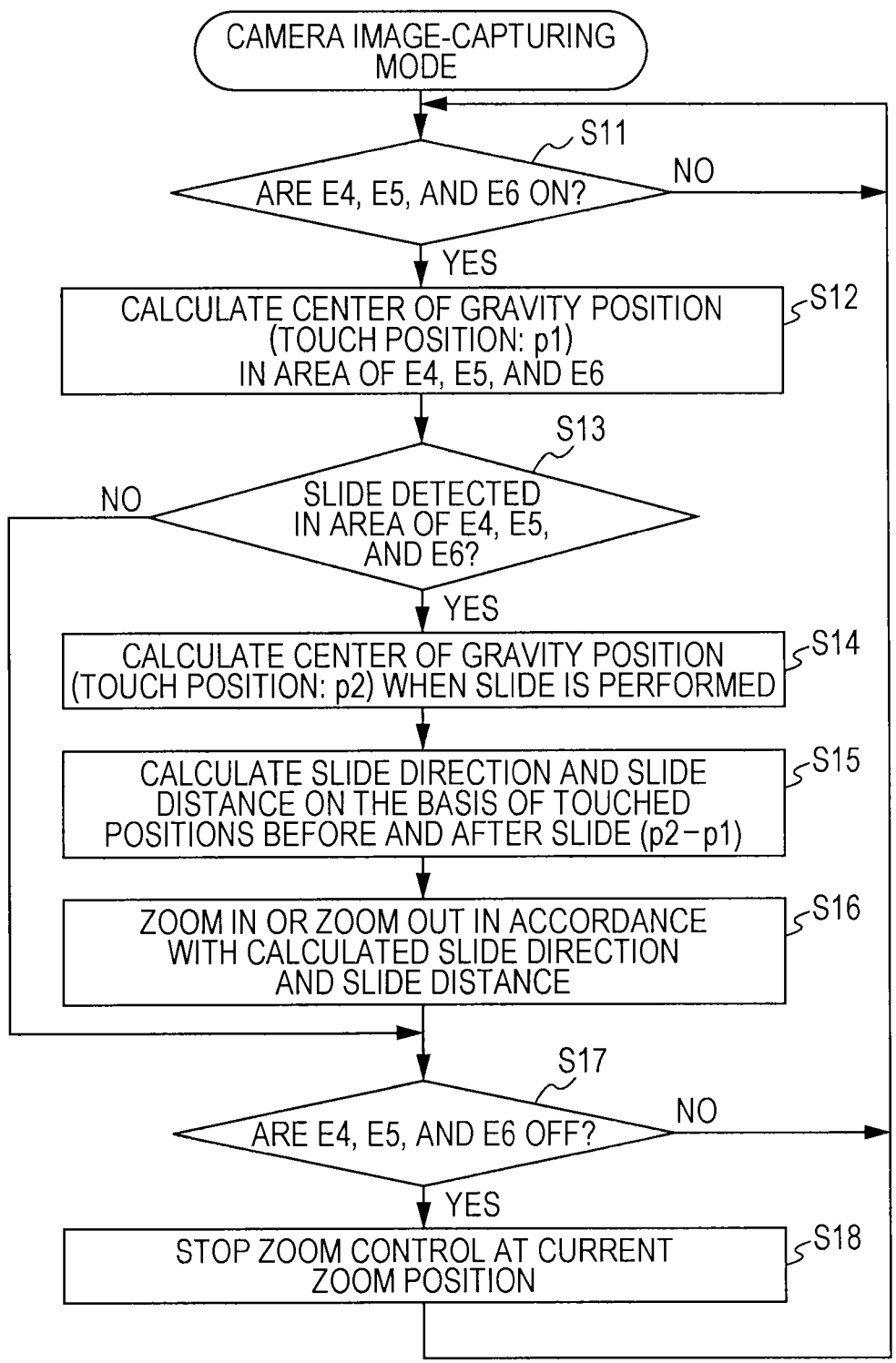
FIG. 27 is a flowchart illustrating the flow of processing when a camera application program and an operation control program of the present embodiment are executed during an image-capturing mode.

FIG. 27 illustrates the flow of processing when the camera application program and the operation control program in the image-capturing mode are executed.

The example of FIG. 27 shows a processing example in a case where twelve conductive print patterns E1 to E12 shown in FIG. 22 are capacitively coupled to the touch panel section 30 and, in particular, the image-capturing angle of view zoom-in/zoom-out function is assigned to the conductive print patterns E4, E5, and E6, as shown in FIG. 23.

In the flowchart of FIG. 27, when the camera application program is being executed in the image-capturing mode, in the process of step S11, the control unit 2 monitors whether or not a touch by the user has been detected in the extended detection area using the conductive print patterns E4, E5, and E6.

Here, in a case where, for example, any position in the extended detection area using the conductive print patterns E4, E5, and E6 is touched by the user, the touch-panel scan unit 19 detects a change in the electrostatic capacitance from only the predetermined square transparent electrode units that are capacitively coupled to the conductive print patterns E4, E5, and E6 from among all the square transparent electrode units 40X and 40Y of the X-Y transparent electrode pattern part 31, and also outputs the electrostatic capacitance detection values and the coordinate values of those predetermined square transparent electrode units to the control unit 2. Therefore, when the coordinate values and the electrostatic capacitance detection values of the predetermined square transparent electrode units that are capacitively coupled to the conductive print patterns E4, E5, and E6 are supplied from the touch-panel scan unit 19, the control unit 2 can determine that the touch by the user has been detected in the extended detection area.

Then, in a case where the touch by the user has been detected in the extended detection area using the conductive print patterns E4, E5, and E6, the control unit 2 causes the process to proceed to step S12.

When the process proceeds to step S12, on the basis of the output of the touch-panel scan unit 19, the control unit 2 calculates which position in the extended detection area using the conductive print patterns E4, E5, and E6 the user has touched.

That is, in step S12, the control unit 2 obtains a position p1 which is a certain position in the extended detection area that the user has touched on the basis of a center of gravity position calculation similar to that of FIG. 26, which is based on the coordinate values and the electrostatic capacitance detection values of the square transparent electrode units that are capacitively coupled to the conductive print pattern E4, the coordinate values and the electrostatic capacitance detection values of the square transparent electrode units that are capacitively coupled to the conductive print pattern E5, and the coordinate values and the electrostatic capacitance detection values of the square transparent electrode units that are capacitively coupled to the conductive print pattern E6.

Furthermore, in the process of step S13, the control unit 2 determines whether or not the touch position has been moved (operated to slide) while the touch state is being maintained in the extended detection area using the conductive print patterns E4, E5, and E6. Then, in a case where the slide operation of the touch position has been detected, the control unit 2 causes the process to proceed to step S14 and subsequent steps. On the other hand, in a case where the slide operation has not been detected (the touch position has not been moved), the control unit 2 causes the process to proceed to step S17.

When a slide operation has not been detected in step S13 and the process proceeds to step S17, the control unit 2 determines whether or not the touch by the user has been released in the extended detection area using the conductive print patterns E4, E5, and E6. In a case where the touch has not been released, the control unit 2 causes the process to proceed to step S11, and in a case where the touch has been released, the control unit 2 causes the process to return to step S18.

When the process proceeds to the process of step S18, the control unit 2 controls the camera unit 16 through the image-capturing control arithmetic unit 15, thereby stopping zoom control while the image-capturing angle of view of the optical system of the camera unit 16 is maintained at the zoom position at the current time. Thereafter, the control unit 2 causes the process to return to step S11.

On the other hand, when the process proceeds to step S14 as a result of the slide operation at the touch position being detected in step S13, the control unit 2 obtains a touch position p2 that has been moved by the slide operation on the basis of a center of gravity position calculation similar to that described above.

Next, in the process of step S15, the control unit 2 calculates the direction of the slide operation and the movement distance (p2−p1) of the touch position by the slide operation on the basis of the touch position p1 before the slide operation is performed and the touch position p2 that has been moved by the slide operation.

Then, in the process of step S16, the control unit 2 controls the camera unit 16 through the image-capturing control arithmetic unit 15, thereby performing zoom in or zoom out of the image-capturing angle of view of the optical system of the camera unit 16 in accordance with the slide direction and the slide distance, which are calculated in step S15. That is, as an example, in the extended detection area using the conductive print patterns E4, E5, and E6, in a case where the slide operation in one arrangement direction of the conductive print patterns E4, E5, and E6 is associated with zoom in, and the slide operation in the other arrangement direction is associated with zoom out, the control unit 2 causes the image-capturing angle of view to be zoomed in by an amount corresponding to the slide distance when the direction of the slide operation is in the one arrangement direction, and in contrast, when the direction of the slide operation is in the other arrangement direction, the control unit 2 causes the image-capturing angle of view to be zoomed out by an amount corresponding to the slide distance.

After the process of step S16, the control unit 2 causes the process to proceed to step S17, where the control unit 2 determines whether or not the touch by the user has been released in the extended detection area using the conductive print patterns E4, E5, and E6. The control unit 2 causes the process to return to step S11 in a case where the touch has not been released, and causes the process to proceed to step S18 when the touch has been released.

When the process proceeds to step S18, the control unit 2 controls the camera unit 16 through the image-capturing control arithmetic unit 15, stopping zoom control by maintaining the image-capturing angle of view of the optical system of the camera unit 16 at the zoom position at the current time. Thereafter, the control unit 2 causes the process to return to step S11.

According to the processing example of the flowchart of FIG. 27, in a case where the camera application program is being executed in the camera image-capturing mode, the portable information terminal of the present embodiment can realize image-capturing angle of view control such that the zoom position is dynamically changed in accordance with the direction and the distance of the slide operation in a case where the touch by the user is performed at any position in the extended detection area using the conductive print patterns E4, E5, and E6, and furthermore, the touch position is made to slide in the extended detection area. For this reason, the user using the portable information terminal of the present embodiment can quickly and easily specify the zoom position of the image-capturing angle of view.

Furthermore, according to the processing example of the flowchart of FIG. 27, on the display screen of the portable information terminal, for example, a zoom slider bar icon or the like for showing the zoom position of the image-capturing angle of view does not need to be displayed. Thus, the display on the display screen is not obstructed by the zoom slider bar icon or the like, and effective use of the display screen is possible.

In the flowchart example of FIG. 27, when a slide operation is performed in the extended detection area using the conductive print patterns E4, E5, and E6, the image-capturing angle of view is controlled in accordance with the slide direction and the slide distance. As another example, automatic adjustment of the image-capturing angle of view corresponding to the touch position may be performed when the touch position is detected in the extended detection area using the conductive print patterns E4, E5, and E6.

That is, in the case of this example, for example, when the slide operation has not been detected (the touch position has not been moved) in step S13, the control unit 2 calculates the percentage (%) of the touch position of the user in the extended detection area with respect to the width of the arrangement direction of the conductive print patterns E4, E5, and E6 in the extended detection area. Next, the control unit 2 calculates a zoom position (image-capturing angle of view) that becomes $Z \cdot p1/100$ with respect to the total zoom range Z of the image-capturing angle of view. In addition, the control unit 2 compares the zoom position of $Z \cdot p1/100$ with the zoom position of the optical system of the camera unit 16 at the current time. Since the zoom position at the current time differs from the zoom position of Z·p1/100, the control unit 2 determines whether or not it is necessary to change the image-capturing angle of view of the optical system to the zoom position of Z·p1/100. Then, in a case where the control unit 2 determines that the change is not necessary because the zoom position at the current time is the same as the zoom position of Z·p1/100, the control unit 2 causes the process to return to step S11. On the other hand, in a case where the control unit 2 determines that it is necessary to change the zoom position, the control unit 2 controls the camera unit 16 through the image-capturing control arithmetic unit 15, causing the image-capturing angle of view of the optical system of the camera unit 16 to move to the zoom position of Z·p1/100. Thereafter, the control unit 2 causes the process to proceed to step S17. Then, when the process proceeds to the process of step S17, the control unit 2 determines whether or not the touch by the user has been released in the extended detection area using the conductive print patterns E4, E5, and E6. In a case where the touch has not been released, the control unit 2 causes the process to return to step S11, and when the touch has been released, the control unit 2 causes the process to proceed to step S18. When the process proceeds to step S18, the control unit 2 controls the camera unit 16 through the image-capturing control arithmetic unit 15, stopping zoom control by maintaining the image-capturing angle of view of the optical system of the camera unit 16 at the zoom position at the current time. Thereafter, the control unit 2 causes the process to return to step S11.

In the case of this example, it becomes possible for the portable information terminal of the present embodiment to specify an image-capturing angle of view on the basis of the slide operation in the extended detection area and also specify an image-capturing angle of view on the basis of a touch position in the extended detection area, making it possible to quickly realize an image-capturing angle of view desired by the user.

In addition, it is possible for the portable information terminal of the present embodiment to switch, in accordance with the selection by the user, between a specification mode of the image-capturing angle of view on the basis of the slide operation in the extended detection area and a specification mode of the image-capturing angle of view on the basis of a touch position in the extended detection area, such as those described above.

[Example of Flowchart when Character Input Application Program is Executed]

Figure 28:
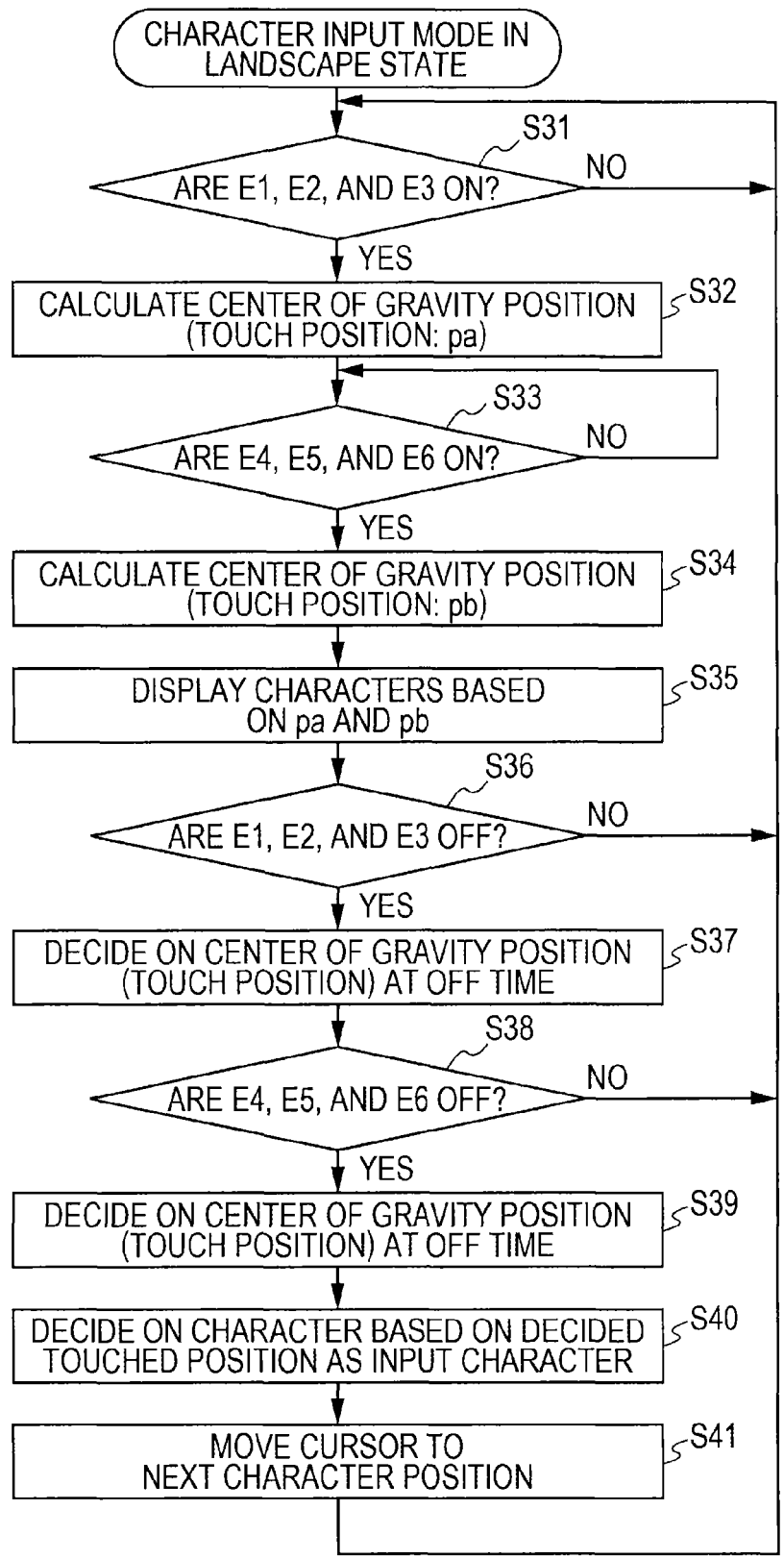
FIG. 28 is a flowchart illustrating the flow of processing when a character input application program and the operation control program of the present embodiment are executed.

FIG. 28 illustrates the flow of processing when the character input application program and the operation control program are executed.

The example of FIG. 28 shows a processing example in a case where twelve conductive print patterns E1 to E12 shown in FIG. 22 are capacitively coupled to the touch panel section 30 and, in particular, the character specification and the specified character decision functions are assigned to the conductive print patterns E1, E2, and E3, and E4, E5, and E6, as shown in FIG. 23.

In the flowchart of FIG. 28, when the character input application program is being executed, in the process of step S31, the control unit 2 monitors whether or not a touch by the user has been detected in the extended detection area using the conductive print patterns E1, E2, and E3.

Here, in a case where, for example, any position in the extended detection area using the conductive print patterns E1, E2, and E3 has been touched by the user, the touch-panel scan unit 19 detects a change in the electrostatic capacitance from only the predetermined square transparent electrode units that are capacitively coupled to the conductive print patterns E1, E2, and E3 from among all the square transparent electrode units 40X and 40Y of the X-Y transparent electrode pattern part 31, and also outputs the electrostatic capacitance detection values and the coordinate values of those predetermined square transparent electrode units to the control unit 2. Therefore, when the coordinate values of the predetermined square transparent electrode units that are capacitively coupled to the conductive print patterns E1, E2, and E3 and the electrostatic capacitance detection values are supplied from the touch-panel scan unit 19, the control unit 2 can determine that a touch by the user has been detected in the extended detection area.

Then, in a case where a touch by the user has been detected in the extended detection area using the conductive print patterns E1, E2, and E3, the control unit 2 causes the process to proceed to step S32.

When the process proceeds to the process of step S32, the control unit 2 calculates which position in the extended detection area using the conductive print patterns E1, E2, and E3 the user has touched on the basis of the output of the touch-panel scan unit 19.

That is, in step S32, the control unit 2 obtains a position pa which is a certain position in the extended detection area that the user has touched on the basis of a center of gravity position calculation similar to that described above of FIG. 26, which is based on the coordinate values of the square transparent electrode units that are capacitively coupled to the conductive print pattern E1 and the electrostatic capacitance detection values, the coordinate values of the square transparent electrode units that are capacitively coupled to the conductive print pattern E2 and the electrostatic capacitance detection values, and the coordinate values of the square transparent electrode units that are capacitively coupled to the conductive print pattern E3 and the electrostatic capacitance detection values.

Furthermore, when the character input application program is being executed, at the same time as for the processing of steps S31 to S32, the control unit 2 monitors, in the process of step S33, whether or not a touch by the user has been detected in the extended detection area using the conductive print patterns E4, E5, and E6.

In a case where, for example, any position in the extended detection area using the conductive print patterns E4, E5, and E6 has been touched by the user, the touch-panel scan unit 19 detects a change in the electrostatic capacitance from only the predetermined square transparent electrode units that are capacitively coupled to the conductive print patterns E4, E5, and E6 from among all the square transparent electrode units 40X and 40Y of the X-Y transparent electrode pattern part 31, and also outputs the electrostatic capacitance detection values and the coordinate values of those predetermined square transparent electrode units to the control unit 2. Therefore, when the coordinate values of the predetermined square transparent electrode units that are capacitively coupled to the conductive print patterns E4, E5, and E6, and the electrostatic capacitance detection values are supplied from the touch-panel scan unit 19, the control unit 2 can determine that the touch by the user has been detected in the extended detection area.

Then, in a case where the control unit 2 detects the touch by the user in the extended detection area using the conductive print patterns E4, E5, and E6, the control unit 2 causes the process to proceed to step S34.

When the process proceeds to the process of S34, the control unit 2 calculates which position in the extended detection area using the conductive print patterns E4, E5, and E6 the user has touched on the basis of the output of the touch-panel scan unit 19.

That is, in step S34, the control unit 2 obtains a position pb which is a certain position in the extended detection area that the user has touched on the basis of a center of gravity position calculation similar to that of FIG. 26, which is based on the coordinate values of the square transparent electrode units that are capacitively coupled to the conductive print pattern E4 and the electrostatic capacitance detection values, the coordinate values of the square transparent electrode units that are capacitively coupled to the conductive print pattern E5 and the electrostatic capacitance detection values, and the coordinate values of the square transparent electrode units that are capacitively coupled to the conductive print pattern E6 and the electrostatic capacitance detection values.

Then, when the touch position pa and the touch position pb are calculated by the processing of steps S31 to S34, the control unit 2, in the process of S35, refers to, for example, the above-mentioned table, and thereby displays a character corresponding to the combination of the touch position pa and the touch position pb as a specification character before a decision is made at the cursor position or the like on the display screen.

Next, in the process of S36, the control unit 2 determines whether or not the touch has been released in the extended detection area using the conductive print patterns E1, E2, and E3. When the touch has not been released, the control unit 2 causes the process to return to step S31, and when the touch has been released, the control unit 2 causes the process to proceed to step S37.

When the process proceeds to step S37, the control unit 2 decides on the center of gravity position of the touch position immediately before the touch is released in the extended detection area using the conductive print patterns E1, E2, and E3.

Furthermore, in the process of step S38, the control unit 2 determines whether or not the touch has been released in the extended detection area using the conductive print patterns E4, E5, and E6. When the touch has not been released, the control unit 2 causes the process to return to step S31, and when the touch has been released, the control unit 2 causes the process to proceed to step S39.

When the process proceeds to the process of step S39, the control unit 2 decides on the center of gravity position of the touch position immediately before the touch is released in the extended detection area using the conductive print patterns E4, E5, and E6.

Then, in the process of step S40, the control unit 2 refers to, for example, the above-mentioned table or the like, and thereby causes the decided character corresponding to the combination of both the touch positions to be displayed, as a decided character, on the display screen.

After that, in the process of step S41, the control unit 2 moves the cursor position on the display screen to the next character input position, enters a state of waiting for the next character to be input, and the control unit 2 causes the process to return to step S31.

According to the processing example of the flowchart of FIG. 28, in a case where the character input application program is being executed, the portable information terminal of the present embodiment can realize the specification and the decision of a character corresponding to the combination of the touch position in the extended detection area using the conductive print patterns E1, E2, and E3 and the touch position in the extended detection area using the conductive print patterns E4, E5, and E6. For this reason, it is possible for the user using the portable information terminal of the present embodiment to easily and quickly perform character input.

Furthermore, according to the processing example of the flowchart of FIG. 28, for example, a software keyboard for inputting characters, or the like is not displayed on the display screen. Consequently, the display on the display screen is not obstructed by the software keyboard or the like, and the effective use of the display screen becomes possible.

In addition, according to the processing example of the flowchart of FIG. 28, a character desired by the user is specified and displayed in accordance with a slide operation in the extended detection area. Consequently, it is possible for the user to easily confirm the character in the specified state, with the result that the number of input mistakes of characters becomes very small.

As described above, the portable information terminal of the present embodiment makes it possible to realize an operation system that is very easy to use for the user.

SUMMARY

The touch panel device according to the embodiment is configured to include an electrostatic capacitance type touch sensor unit in which a plurality of transparent electrode units are arranged in X and Y directions; and a conductive layer that is connected to predetermined transparent electrode units among the plurality of transparent electrode units forming the electrostatic capacitance type touch sensor unit and that extends outward from an arrangement area of the plurality of transparent electrode units.

Here, the conductive layer is formed of a conductive print layer that is printed in a predetermined component section included in the touch panel device, and is connected in such a manner as to be capacitively coupled to the predetermined transparent electrode units of the electrostatic capacitance type touch sensor unit.

The touch panel device further includes an auxiliary wiring part for capacitively coupling the conductive print layer to the predetermined transparent electrode units.

The predetermined component section is a transparent window plate that is arranged on a front side of the electrostatic capacitance type touch sensor unit and that is wider than the arrangement area of the plurality of transparent electrode units, and the conductive print layer is printed on a plate surface of the transparent window plate.

The predetermined component section is a bending plate that extends outward from the electrostatic capacitance type touch sensor unit and that is bent in the direction of a side surface when the surface of the electrostatic capacitance type touch sensor unit is set as a front side, and the conductive print layer is printed on a plate surface of the bending plate.

The conductive layer is formed of a conductive print layer that is printed in a predetermined component section included in the touch panel device, and is connected in such a manner as to be joined to the predetermined transparent electrode units of the electrostatic capacitance type touch sensor unit.

The conductive layer is formed of a conductive sheet which is a conductive material formed in a sheet-like shape, and is connected in such a manner as to be capacitively coupled to the predetermined transparent electrode units of the electrostatic capacitance type touch sensor unit.

The conductive layer is formed of a conductive sheet which is a conductive material formed in a sheet-like shape, and is connected in such a manner as to be joined to the predetermined transparent electrode units of the electrostatic capacitance type touch sensor unit.

The conductive layer has a window part through which light is passed, and includes a light-emitting unit that emits light that passes through the window part of the conductive layer.

A plurality of the conductive layers are provided, the predetermined transparent electrode units are formed as a plurality of conduction print units corresponding to the number of the conductive layers, and the conductive layers are connected to corresponding predetermined transparent electrode units.

Next, the portable information terminal according to the embodiment includes a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units; a position detection unit that calculates a position at which an external conductor has approached a surface of the touch panel section on the basis of an electrostatic capacitance change detection output of the electrostatic capacitance type touch sensor unit; and a program execution unit that executes a desired application program. Then, when the approached position calculated by the position detection unit is an approached position based on the electrostatic capacitance change detection output by the predetermined transparent electrode units connected to the conductive layer, the program execution unit executes a specific program included in the application program.

Here, in the portable information terminal according to the embodiment, the conductive layer is formed of a conductive print layer that is printed in a predetermined component section included in the touch panel section, and is connected in such a manner as to be capacitively coupled to the predetermined transparent electrode units of the electrostatic capacitance type touch sensor unit.

In the portable information terminal according to the embodiment, the touch panel section includes an auxiliary wiring part for capacitively coupling the conductive print layer to the predetermined transparent electrode units.

In the portable information terminal according to the embodiment, the predetermined component section is a transparent window plate that is arranged on a front side of the electrostatic capacitance type touch sensor unit and that is wider than an arrangement area of the plurality of transparent electrode units, and the conductive print layer is printed on a plate surface of the transparent window plate.

In the portable information terminal according to the embodiment, the predetermined component section is a bending plate that extends outward from the electrostatic capacitance type touch sensor unit and that is bent in the direction of a side surface when the surface of the electrostatic capacitance type touch sensor unit is set as a front side, and the conductive print layer is printed on a plate surface of the bending plate.

In the portable information terminal according to the embodiment, the conductive layer is formed of a conductive print layer that is printed in a predetermined component section included in the touch panel device, and is connected in such a manner as to be joined to the predetermined transparent electrode units of the electrostatic capacitance type touch sensor unit.

In the portable information terminal according to the embodiment, the conductive layer is formed of a conductive sheet which is a conductive material formed in a sheet-like shape, and is connected in such a manner as to be capacitively coupled to the predetermined transparent electrode units of the electrostatic capacitance type touch sensor unit.

In the portable information terminal according to the embodiment, the conductive layer is formed of a conductive sheet which is a conductive material formed in a sheet-like shape, and is connected in such a manner as to be joined to the predetermined transparent electrode units of the electrostatic capacitance type touch sensor unit.

In the portable information terminal according to the embodiment of the present invention, the conductive layer has a window part through which light is passed, and includes a light-emitting unit that emits light that passes through the window part of the conductive layer.

In the portable information terminal according to the embodiment of the present invention, a plurality of the conductive layers are provided, the predetermined transparent electrode units are formed as a plurality of conduction print units corresponding to the number of the conductive layers, and the conductive layers are connected to corresponding predetermined transparent electrode units.

In the portable information terminal according to the embodiment of the present invention, the position detection unit calculates a center of gravity position of a position at which the external conductor has approached in the arrangement area of the conductive layers on the basis of an electrostatic capacitance change detection output by each conductive print unit corresponding to each conductive layer.

When the desired application program is a moving image reproduction application program, and the specific program is a program that specifies the reproduction position of the moving image and reproduces a moving image from the reproduction position, the program execution unit executes the specific program on the basis of the center of gravity position calculated by the position detection unit, and reproduces the moving image from the reproduction position corresponding to the center of gravity position.

The portable information terminal according to the embodiment of the present invention further includes an image-capturing unit that captures an image of a subject by adjusting an image-capturing angle of view. Then, when the desired application program is a camera image-capturing application program, and the specific program is a program that adjusts and controls an image-capturing angle of view of the image-capturing unit, the program execution unit executes the specific program on the basis of a movement direction and a movement distance when the center of gravity position calculated by the position detection unit is moved, and adjusts the image-capturing angle of view of the image-capturing unit to an image-capturing angle of view corresponding to the movement direction and the movement distance of the center of gravity position.

When the desired application program is a character input application program, and the specific program is a program that specifies an input character, the program execution unit executes the specific program on the basis of the center of gravity position calculated by the position detection unit, and specifies an input character corresponding to the center of gravity position.

Next, an operation control method according to an embodiment of the present invention is an operation control method for a portable information terminal including a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units; a position detection unit that calculates a position at which an external conductor has approached a surface of the touch panel section on the basis of an electrostatic capacitance change detection output of the electrostatic capacitance type touch sensor unit; and a program execution unit that executes a desired application program. Then, in the operation control method according to the present embodiment, when the approached position calculated by the position detection unit is an approached position based on the electrostatic capacitance change detection output by the predetermined transparent electrode units connected to the conductive layer, the program execution unit executes a specific program included in the application program.

Next, an operation control program according to an embodiment of the present invention is an operation control program for a portable information terminal including a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units. Then, the operation control program of the present embodiment, serving as a position detection unit that calculates a position at which an external conductor has approached a surface of the touch panel section on the basis of an electrostatic capacitance change detection output of the electrostatic capacitance type touch sensor unit, and a program execution unit that executes a desired application program, causes a computer of the portable information terminal to operate.

Next, a recording medium according to an embodiment of the present invention is a recording medium having recorded thereon an operation control program for a portable information terminal including a touch panel section including an electrostatic capacitance type touch sensor unit in which a plurality of transparent electrode units are arranged in X and Y directions, and a conductive layer that is connected to predetermined transparent electrode units among the plurality of transparent electrode units forming the electrostatic capacitance type touch sensor unit and that extends outward from an arrangement area of the plurality of transparent electrode units. Then, the recording medium of the present embodiment has recorded thereon an operation control program, serving as a position detection unit that calculates a position at which an external conductor has approached a surface of the touch panel section on the basis of an electrostatic capacitance change detection output of the electrostatic capacitance type touch sensor unit, and a program execution unit that executes a desired application program, for causing a computer of the portable information terminal to operate.

As has been described above, in the electrostatic capacitance type touch panel device, and the portable information terminal including the touch panel device according to the embodiment of the present invention, function button functions and the like are realized at a low cost and small size without obstructing, for example, the display on the display screen, and a high degree of freedom of the arrangement position thereof is made possible.

Furthermore, in the electrostatic capacitance type touch panel device, and the portable information terminal including the touch panel device according to the embodiment of the present invention, function button functions having a high degree of freedom of the arrangement position thereof with a low cost and small size can be realized. Also, function button functions that are easy to use for the user can be realized in accordance with an application program that is being executed.

As long as the portable information terminal of the present embodiment includes an electrostatic capacitance type touch panel function to which a conductive print pattern similar to that described above is capacitively coupled, the portable information terminal can be applied to, for example, a so-called PDA (Personal Digital Assistant), a notebook personal computer, a portable game machine, or a mobile terminal such as a portable navigation terminal, and also to various stationary electronic devices, in addition to, for example, a highly functional portable telephone terminal, a tablet terminal, or a slate PC.

The above-described embodiments are examples of the present invention. Therefore, the present invention is not limited to the above-described embodiments. Of course, various changes are possible according to design or the like within a range not departing from the technical concept of the present invention.

In addition, it should be understood, of course, by those skilled in the art that various modifications, combinations, and other embodiments may be made according to the design or other elements insofar as they come within the scope of the claims of the present invention, or the equivalence thereof.

REFERENCE SIGNS LIST

1 . . . communication unit, 2 . . . control unit, 3 . . . button operation unit, 4 . . . storage unit, 5 . . . external input/output terminal unit, 6 . . . external memory slot, 7 . . . external memory, 10 . . . audio processing unit, 11 . . . microphone, 12 . . . speaker, 13 . . . display control unit, 14 . . . display, 15 . . . image-capturing control arithmetic unit, 16 . . . camera unit, 17 . . . light-emitting unit, 18 . . . IC, 19 . . . touch-panel scan unit, 20 . . . touch panel, 30 . . . touch panel section, 31 . . . X-Y transparent electrode pattern part, 33 (33a, 33b, 33c) . . . conductive print pattern, 34 . . . flexible printed substrate, 35 . . . IC, 36 . . . sensor glass part, 37 . . . auxiliary wiring pattern, 40X, 40Y . . . square transparent electrode unit, 43X, 43Y . . . outer edge wiring pattern, 50 . . . terminal housing, 51 . . . window glass, 52 . . . anti-static film, 53 (53a, 53b, 53c) print screen for icon, 54 . . . black screen, 56, 58 . . . transparent laminate film, 59, 62 . . . polarized plate, 60 . . . color filter, 63 . . . backlight unit, 64 . . . backlight frame, 65 . . . IC for display, 67 . . . laminate film used to paste window glass, 71 . . . pattern extended substrate, 81a, 81b, 81c . . . window part for illumination, 88 . . . joining contact member

What is claimed is:

1. A touch panel device comprising:
an electrostatic capacitance type touch sensor in which a plurality of transparent electrode units are arranged in X and Y directions;
a conductive layer that is connected to predetermined transparent electrode units among the plurality of transparent electrode units forming the electrostatic capacitance type touch sensor unit and that extends outward from an arrangement area of the plurality of transparent electrode units, wherein the conductive layer has a point of termination at an outer edge of a region formed by the plurality of transparent electrode units; and circuitry configured to detect a position at which an external object contacts a surface near the electronic capacitance type touch sensor and detect when the external object contacts a surface at a position which is above the conductive layer and which is external and not above the region formed by the plurality of transparent electrode units such that the contact that is not above the region formed by the plurality of transparent electrode units is still sensed as an electrostatic capacitance change at the X and Y coordinate point of the outer edge of the region formed by the plurality of transparent electrode units based on a capacitive coupling between the conductive layer and the outer edge and the region formed by the plurality of transparent electrode units, and execute a predetermined application program based on the detected position, wherein the electrostatic capacitance type touch sensor is configured to overlap a display device, and the display device includes an effective display area that is configured to be visible to a user through a housing, and the X and Y coordinate point of the outer edge of the region formed by the plurality of transparent electrode units is configured to be outside of a region of the electrostatic capacitance type touch sensor that overlaps the effective display area.

2. The touch panel device of claim 1, wherein the circuitry detects the position based on an electrode capacitance change of the transparent electrode units.

3. The touch panel device of claim 1, wherein the conductive layer includes a bent portion that is bent at a right angle with respect to the arrangement area of the plurality of transparent electrode units.

4. The touch panel device of claim 3, wherein the circuitry detects a position at which the external object contacts a surface near the bent portion, wherein the surface near the bent portion is bent at a right angle with respect to the arrangement area of the plurality of transparent electrode units.

5. The touch panel device of claim 3, wherein the arrangement area has four sides, and at each of the four sides there is a conductive layer connected to predetermined transparent electrode units among the plurality of transparent electrode units forming the electrostatic capacitance type touch sensor unit and that extends outward from the arrangement area.

6. The touch panel device of claim 5, wherein at each of the four sides of the arrangement area there are a plurality of conductive layers, each connected to predetermined transparent electrode units among the plurality of transparent electrode units forming the electrostatic capacitance type touch sensor unit and extending outward from the arrangement area.

7. The touch panel device of claim 6, wherein the plurality of conductive layers at each side of the arrangement area is an extended detection area that corresponds to a different application of a plurality of applications.

8. The touch panel device of claim 7, wherein at least one of the extended detection areas at one side of the arrangement area provides a slider function or a scrolling function.

9. The touch panel device of claim 7, wherein the plurality of applications includes at least one of a camera image reproduction mode, a camera image capturing mode, a moving image reproduction mode, a mail application, and a character input mode.

10. The touch panel device of claim 1, further comprising an illumination sheet disposed behind the conductive layer that is configured to emit light, and the conductive layer includes a cut out part where the illumination sheet is disposed.

11. The touch panel device of claim 1, wherein the circuitry includes an integrated circuit (IC).

12. A portable information terminal comprising:

a housing;

a display device;

an electrostatic capacitance type touch sensor in which a plurality of transparent electrode units are arranged in X and Y directions;

a conductive layer that is connected to predetermined transparent electrode units among the plurality of transparent electrode units forming the electrostatic capacitance type touch sensor and that extends outward from an arrangement area of the plurality of transparent electrode units, wherein the conductive layer has a point of termination at an outer edge of a region formed by the plurality of transparent electrode units; and circuitry configured to detect a position at which an external conductor approaches the electronic capacitance type touch sensor and detect when the external conductor contacts a surface at a position which is above the conductive layer and which is external and not above the region formed by the plurality of transparent electrode units such that the contact that is not above the region formed by the plurality of transparent electrode units is still sensed as an electrostatic capacitance change at the X and Y coordinate point of the outer edge of the region formed by the plurality of transparent electrode units based on a capacitive coupling between the conductive layer and the outer edge and the region formed by the plurality of transparent electrode units, and execute a predetermined application program based on the detected position, wherein the electronic capacitance type touch sensor is configured to overlap the display device, and the display device includes an effective display area that is configured to be visible to a user through the housing, and the X and Y coordinate point of the outer edge of the region formed by the plurality of transparent electrode units is configured to be outside of a region of the electronic capacitance type touch sensor that overlaps the effective display area.

13. The portable information terminal of claim 12, wherein the conductive layer includes a bent portion that is disposed within the housing and is bent at a right angle with respect to the arrangement area of the plurality of transparent electrode units.

14. The portable information terminal of claim 13, wherein the circuitry detects a position at which the external object contacts a surface of the housing near the bent portion, wherein the surface of the housing near the bent portion is bent at a right angle with respect to the arrangement area of the plurality of transparent electrode units.

15. The touch panel device of claim 12, further comprising an illumination sheet disposed behind the conductive layer that is configured to emit light, the conductive layer includes a cut out part where the illumination sheet is disposed, and the housing includes an icon area disposed above the conductive layer and that is configured to be illuminated by the light that is emitted from the illumination sheet.

* * * * *